(12) United States Patent
Yamada et al.

(10) Patent No.: US 12,454,143 B2
(45) Date of Patent: Oct. 28, 2025

(54) PRINTING RECORDING METHOD

(71) Applicant: SEIKO EPSON CORPORATION, Tokyo (JP)

(72) Inventors: Akiko Yamada, Shiojiri (JP); Takamitsu Kondo, Azumino (JP); Daisuke Sakuma, Minowa (JP); Kosuke Chidate, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 214 days.

(21) Appl. No.: 18/192,976

(22) Filed: Mar. 30, 2023

(65) Prior Publication Data
US 2023/0347675 A1    Nov. 2, 2023

(30) Foreign Application Priority Data

Mar. 31, 2022 (JP) .................................. 2022-058605

(51) Int. Cl.
*B41M 5/00*    (2006.01)
*B41J 2/14*    (2006.01)
*C09D 11/54*    (2014.01)
*D06P 5/30*    (2006.01)

(52) U.S. Cl.
CPC .......... *B41M 5/0017* (2013.01); *B41J 2/1433* (2013.01)

(58) Field of Classification Search
CPC ................ B41J 3/4078; B41M 5/0082; B41M 5/0041; C09D 11/54; D06P 5/30; D06P 1/00
See application file for complete search history.

(56) References Cited

U.S. PATENT DOCUMENTS

| | | | |
|---|---|---|---|
| 2015/0239263 A1* | 8/2015 | Ishizuka | B41J 3/407 347/16 |
| 2019/0283464 A1* | 9/2019 | Matsuzaki | B41J 2/2117 |
| 2021/0031552 A1 | 2/2021 | Okuda et al. | |
| 2021/0301167 A1* | 9/2021 | Okada | C09D 11/102 |

FOREIGN PATENT DOCUMENTS

| | | |
|---|---|---|
| CN | 112297628 A | 2/2021 |
| JP | 2016-089288 A | 5/2016 |
| JP | 2017-132946 A | 8/2017 |

* cited by examiner

*Primary Examiner* — Jason S Uhlenhake
(74) *Attorney, Agent, or Firm* — Harness, Dickey & Pierce, P.L.C.

(57) ABSTRACT

A printing recording method includes: a chromatic ink adhesion step of adhering a liquid droplet of a chromatic ink composition which contains a pigment and an anionic first resin particle to a cloth; a treatment liquid adhesion step of adhering a liquid droplet of a treatment liquid which contains a cationic compound to the cloth; and an achromatic ink adhesion step of adhering a liquid droplet of an achromatic ink composition which contains an anionic second resin particle to the cloth.

13 Claims, 3 Drawing Sheets

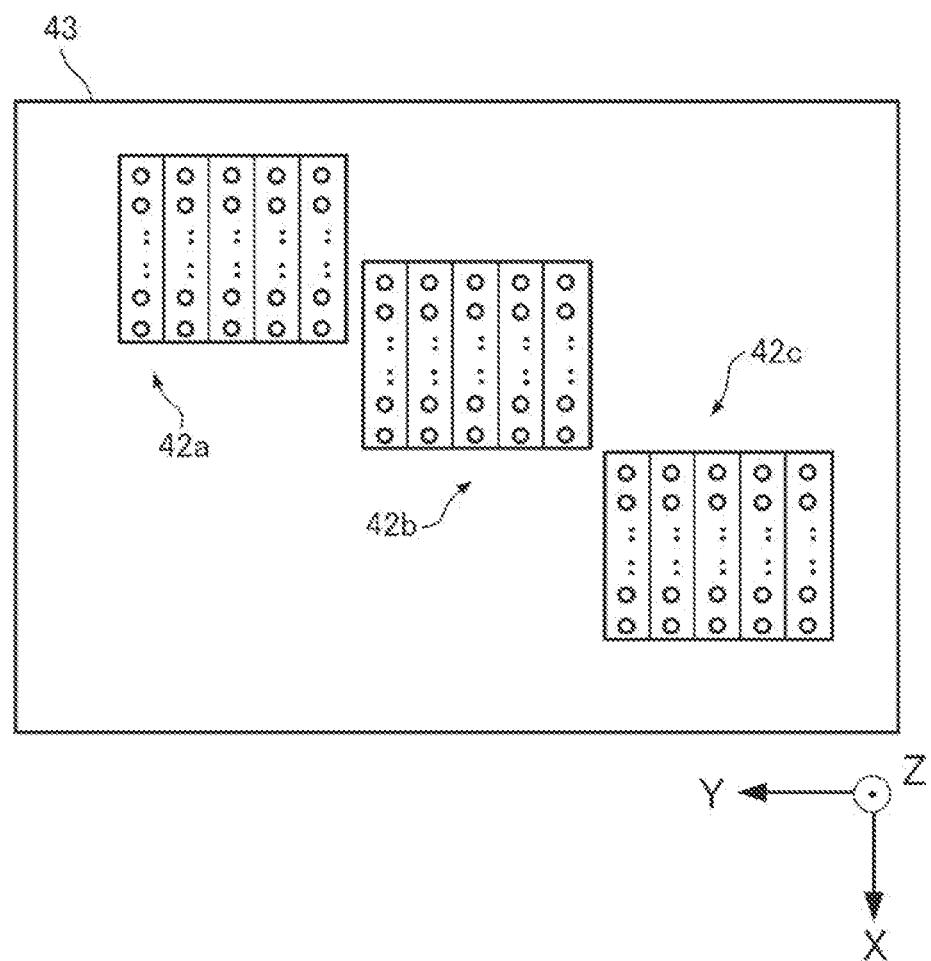

PRINTING RECORDING METHOD

The present application is based on, and claims priority from JP Application Serial Number 2022-058605, filed Mar. 31, 2022, the disclosure of which is hereby incorporated by reference herein in its entirety.

BACKGROUND

1. Technical Field

The present disclosure relates to a printing recording method.

2. Related Art

Heretofore, when a printed matter is manufactured by an ink jet method such that a substrate, such as a cloth, is dyed using a colorant such as a pigment, in order to improve a color development property of the colorant, techniques to perform a pre-treatment on the substrate using a treatment liquid containing a cationic compound or the like have been known. Among the techniques described above, a recording method to perform a pre-treatment step and an ink adhesion step by one recording apparatus has been studied.

For example, in the printing using an ink composition containing a pigment, JP-A-2016-089288 has disclosed a wet-on-wet ink jet printing method in which steps from adhesion of a pre-treatment liquid containing a polyvalent metal compound to adhesion of an ink are performed without performing a drying step therebetween.

However, the method as described above has problems such that bleeding is liable to occur and/or a rubbing fastness is liable to be degraded. In the case described above, it has been known that after the ink is adhered, when a coating liquid containing a resin is further applied thereon, the rubbing fastness can be improved. However, in a related wet-on-wet printing recording method, since the coating liquid is further applied, a moisture amount on a cloth is excessively increased, and as a result, permeation (bleed-through) of the ink and/or the like to a rear side of the cloth unfavorably occurs. That is, a preferable rubbing fastness and a preferable bleed-through suppression cannot be achieved at the same time.

SUMMARY

According to an aspect of the present disclosure, there is provided a printing recording method comprising: a chromatic ink adhesion step of adhering a liquid droplet of a chromatic ink composition which contains a pigment and an anionic first resin particle to a cloth; a treatment liquid adhesion step of adhering a liquid droplet of a treatment liquid which contains a cationic compound to the cloth; and an achromatic ink adhesion step of adhering a liquid droplet of an achromatic ink composition which contains an anionic second resin particle to the cloth. In the printing recording method described above, the treatment liquid adhesion step, the chromatic ink adhesion step, and the achromatic ink adhesion step are performed by an ink jet method, the ink jet method is a method to perform a main scanning a plurality of times for recording by transferring an ink jet head in a direction perpendicular to a transport direction of the cloth, and the ink jet method includes: a simultaneous adhesion step of adhering the treatment liquid and the chromatic ink composition to the same scanning region of the cloth by the same main scanning, and after the simultaneous adhesion step, a post-adhesion step of adhering the achromatic ink composition to the same scanning region of the cloth by a main scanning different from that in the simultaneous adhesion step.

BRIEF DESCRIPTION OF THE DRAWINGS

FIG. 3 is a schematic view showing another example of arrangement of ink jet heads of an ink jet printing apparatus.

DESCRIPTION OF EXEMPLARY EMBODIMENTS

Figure 1:
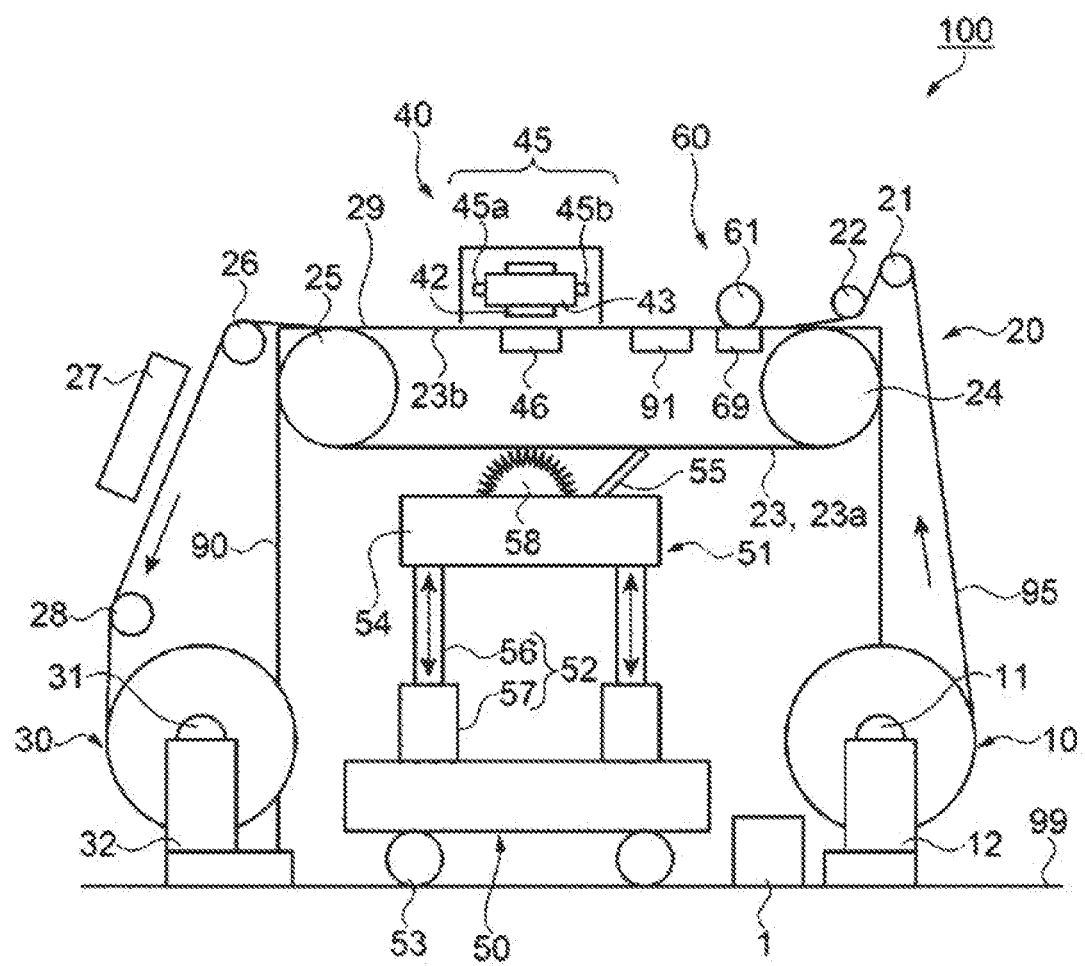
FIG. 1 is a schematic view of an ink jet printing apparatus which can be applied to a printing recording method according to this embodiment.

Hereinafter, embodiments of the present disclosure will be described. The following embodiments are described to explain examples of the present disclosure. The present disclosure is not limited to the following embodiments and includes variously changed and/or modified embodiments to be performed without departing from the scope thereof. In addition, all constituents to be described below are not always required to be essential constituents of the present disclosure.

1. Printing Recording Method

A printing recording method according to one embodiment of the present disclosure includes: a chromatic ink adhesion step of adhering a liquid droplet of a chromatic ink composition which contains a pigment and an anionic first resin particle to a cloth; a treatment liquid adhesion step of adhering a liquid droplet of a treatment liquid which contains a cationic compound to the cloth; and an achromatic ink adhesion step of adhering a liquid droplet of an achromatic ink composition which contains an anionic second resin particle to the cloth. In the printing recording method described above, the treatment liquid adhesion step, the chromatic ink adhesion step, and the achromatic ink adhesion step are performed by an ink jet method, the ink jet method is a method to perform a main scanning a plurality of times for recording by transferring an ink jet head in a direction perpendicular to a transport direction of the cloth, and the ink jet method includes: a simultaneous adhesion step of adhering the treatment liquid and the chromatic ink composition to the same scanning region of the cloth by the same main scanning, and after the simultaneous adhesion step, a post-adhesion step of adhering the achromatic ink composition to the same scanning region of the cloth by a main scanning different from that in the simultaneous adhesion step.

Heretofore, when a printed matter is manufactured by an ink jet method such that a substrate, such as a cloth, is dyed using a colorant such as a pigment, in order to improve the color development property of the colorant, a technique to perform a pre-treatment on the substrate using a treatment liquid containing a cationic compound or the like has been known. In addition, the pre-treatment in the ink jet pigment printing is generally performed, for example, by an immersion method using additional apparatus/facilities. However, in the method as described above, the additional apparatus/facilities are not only required, but by the use thereof, the process of the ink jet pigment printing is also made complicated, and/or the know-how of the process is also required thereby. In addition, since a waste liquid is required to be discharged, the technique described above is also not preferable in terms of environmental load.

Accordingly, in the ink jet pigment printing, a recording method (pre-treatment in-line process) to perform a pre-treatment liquid step to suppress the ink bleeding and to improve the color development property and an ink adhesion step by one recording apparatus has been studied. In the method as described above, the process can be simplified, and the discharge of waste liquid can also be omitted. In particular, by a wet-on-wet method in which the drying to be performed between the pre-treatment liquid step and the ink adhesion step is omitted, advantages, such as a reduction in size of the apparatus and an increase in process speed, can be obtained. On the other hand, by the wet-on-wet recording method, problems may arise such that bleeding is liable to occur, and the color development property and/or the rubbing fastness is liable to be inferior. The reason for this is considered that a moisture amount on a cloth is increased. That is, when the moisture amount on the cloth is high, it is considered that bleeding may be liable to occur, the color development property may be liable to be inferior since an aggregation reaction between the treatment liquid and the ink is not likely to proceed, and furthermore, the rubbing fastness may also be liable to be inferior since the drying is not likely to be sufficiently performed.

Accordingly, in order to improve the rubbing fastness, a recording method including after an ink adhesion step is performed, a step of further applying a coating liquid containing a resin has been known. However, in a related wet-on-wet printing recording method, since the coating liquid is further applied, the moisture amount on a cloth is excessively increased, and a problem of permeation (bleed-through) to a rear side of the cloth may also arise in some cases.

On the other hand, in the printing recording method according to this embodiment, it was found that since the step of simultaneously adhering the treatment liquid and the ink and the step of post-adhering the coating liquid are included, a preferable rubbing fastness can be obtained, and in addition, the bleed-through can be also preferably suppressed. In addition, the color development property can also be made preferable. Since the treatment liquid and the ink are simultaneously adhered, those two materials are likely to be mixed with each other. Accordingly, it is considered that since thickening/aggregation of the ink is further facilitated, and the ink component is likely to stay in the vicinity of the surface of the cloth, the bleed-through can be suppressed, and the color development property can also be made preferable. In addition, since the treatment liquid and the ink are simultaneously adhered, and the coating liquid is adhered a little bit later than that, the treatment liquid and the coating liquid are likely to react with each other. Accordingly, thickening/aggregation of the coating liquid is also facilitated, and a coating liquid layer is more likely to be formed as the outermost surface layer. In addition, since the resin particle and the cationic compound further react with each other, the layer can be made tougher. As a result, it is considered that the bleed-through suppression can be achieved thereby, and the rubbing fastness can also be made preferable.

The printing recording method according to this embodiment is performed on the cloth. A material forming the cloth is not particularly limited, and for example, there may be mentioned natural fibers, such as cotton, hemp, wool, or silk; synthetic fibers, such as a polypropylene, a polyester, an acetate, a triacetate, a polyamide, or a polyurethane; biodegradable fibers such as a polylactic acid; or blended fibers containing at least one of the fibers mentioned above.

The cloth preferably has a hydroxy group. As the cloth as described above, for example, a cloth containing cellulose of cotton, hemp, or the like or a cloth containing a polyurethane may be mentioned. When the cloth has a hydroxy group, a cross-linking reaction possibly occurs between the cationic compound contained in the treatment liquid which will be described later and the hydroxy group of the cloth, and because of the improvement in color development property by the thickening/aggregation and the improvement in adhesion between the cloth and a recording layer, an effect to improve the rubbing fastness may be obtained in some cases.

The cloth may have any form, such as a woven cloth, a knitted cloth, or a non-woven cloth, obtained from the fibers described above. In addition, the basis weight of the cloth used in this embodiment is not particularly limited, and for example, the basis weight may be 1.0 to 10.0 Oz, and is preferably 2.0 to 9.0 Oz, more preferably 3.0 to 8.0 Oz, and further preferably 4.0 to 7.0 Oz. When the basis weight is in the range as described above, a preferable recording can be performed. Furthermore, the printing recording method according to this embodiment can be applied to various types of cloths having different basis weights, and a preferable printing can be performed.

In this embodiment, as the form of the cloth, for example, a fabric, a garment, and an accessory other than those mentioned above may be mentioned. In the fabric, for example, a woven cloth, a knitted cloth, and a non-woven cloth are included. As the garment and the accessory, for example, there may be mentioned sewn products, such as a T shirt, a handkerchief, a scarf, a towel, a handbag, and a cloth-made bag; furniture, such as a curtain, a sheet, a bed cover, and wallpaper; and fabrics before and after cutting to be used as materials to be sewn. As the forms of those materials mentioned above, for example, there may be mentioned a material having a long length in a roll shape, a material cut to have a predetermined size, and a material having a product shape.

As the cloth, a cotton cloth colored by a dye in advance may also be used. As the dye to color the cloth in advance, for example, there may be mentioned a water-soluble dye, such as an acidic dye or a basic dye, a disperse dye to be used in combination with a dispersant, or a reactive dye. When a cotton cloth is used as the cloth, a reactive dye suitable for cotton dyeing is preferably used.

Hereinafter, respective steps of the printing recording method according to this embodiment will be described.

1.1. Chromatic Ink Adhesion Step

The printing recording method according to this embodiment includes a chromatic ink adhesion step of adhering a liquid droplet of a chromatic ink composition which contains a pigment and an anionic first resin particle to a cloth.

An adhesion amount of the chromatic ink composition per unit area of a recording region of the cloth is preferably 10 to 21 $mg/inch^2$, more preferably 12 to 20 $mg/inch^2$, further preferably 14 to 19 $mg/inch^2$, and particularly preferably 15 to 18 $mg/inch^2$. Since the adhesion amount of the chromatic ink composition is in the range described above, the rubbing fastness, the bleed-through suppression, and the color development property tends to be made preferable with a good balance.

1.1.1. Chromatic Ink Composition

The chromatic ink composition used in the printing recording method according to this embodiment contains a pigment and an anionic first resin particle. Hereinafter, the components contained in the chromatic ink composition will be described.

1.1.1.1. Pigment

The chromatic ink composition used in the printing recording method according to this embodiment contains a pigment. As the pigment, for example, an inorganic pigment or an organic pigment may be used. In addition, the pigment is one type of colorant. As the colorant, for example, a pigment or a dye may be mentioned.

Although the inorganic pigment is not particularly limited, for example, there may be mentioned a carbon black, such as a furnace black, a lamp black, an acetylene black, or a channel black; or a white inorganic oxide, such as iron oxide, titanium oxide, zinc oxide, or silica.

As the carbon black, for example, C.I. (Colour Index Generic Name) Pigment Black 1, 7, or 11 may be mentioned. As the carbon black, a commercially available product may also be used, and for example, there may be mentioned No. 2300, No. 900, MCF88, No. 33, No. 40, No. 45, No. 52, MA7, MA8, MA100, or No. 2200B, manufactured by Mitsubishi chemical Co., Ltd.; Raven (registered trademark) 5750, 5250, 5000, 3500, 1255, or 700, manufactured by Columbia Carbon Company; Regal (registered trademark) 400R, 330R, or 660R, Mogul (registered trademark) L, or Monarch (registered trademark) 700, 800, 880, 900, 1000, 1100, 1300, or 1400, manufactured by Cabot Corporation; or Color Black FW1, FW2, FW2V, FW18, FW200, S150, S160, or S170, Printex (registered trademark) 35, U, V, or 140U, or Special Black 6, 5, 4A, or 4, manufactured by Degussa.

As the organic pigment, for example, there may be mentioned a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment, the following may be mentioned.

As a cyan pigment, for example, C.I. Pigment Blue 1, 2, 3, 15:3, 15:4, 15:34, 16, 22, or 60, or C.I. Vat Blue 4 or 60 may be mentioned, and one selected from the group consisting of C.I. Pigment Blue 15:3, 15:4, and 60 or a mixture of at least two of those mentioned above may be preferably mentioned.

As a magenta pigment, for example, C.I. Pigment Red 5, 7, 12, 48 (Ca), 48 (Mn), 57 (Ca), 57:1, 112, 122, 123, 168, 184, or 202, or C.I. Pigment Violet 19 may be mentioned, and one selected from the group consisting of C.I. Pigment Red 122, 202, and 209 and C.I. Pigment Violet 19 or a mixture of at least two of those mentioned above may be preferably mentioned.

As a yellow pigment, for example, C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, or 185 may be mentioned, and one selected from the group consisting of C.I. Pigment Yellow 74, 109, 110, 128, 138, 150, and 180 or a mixture of at least two of those mentioned above may be preferably mentioned.

A pigment other than those mentioned above may also be used. For example, an orange pigment and/or a green pigment may also be used.

The pigment may be used alone, or at least two types thereof may be used in combination.

In addition, in order to enhance the dispersibility of the pigment in the chromatic ink composition, the pigment is preferably surface-treated or mixed with a dispersant or the like.

The surface treatment of the pigment indicates a treatment in which a functional group, such as a carbonyl group, a carboxy group, an aldehyde group, a hydroxy group, a sulfone group, or an ammonium group, or a salt thereof is directly or indirectly bonded to the surface of the pigment by a physical or a chemical treatment.

When the dispersant is mixed in the chromatic ink composition, a dispersant having a hydrophobic portion (hydrophobic group) and a hydrophilic portion (hydrophilic group) in its molecular structure is preferably used. The dispersant as described above has a function in which the hydrophobic portion is adsorbed to a particle surface of the pigment, and the hydrophilic portion is oriented at an aqueous medium side of the chromatic ink composition. By the function described above, the pigment is likely to be stably dispersed in the chromatic ink composition as the dispersion.

The dispersant as described above is not particularly limited, and for example, an acrylic-based resin; a styrene-acrylic-based resin, such as a styrene-(meth)acrylic acid copolymer or a styrene-(meth)acrylic acid-(meth)acrylate copolymer; a styrene-maleic acid-based resin, a salt of at least one of those mentioned above, or a formalin condensate of an aromatic sulfonate salt may be mentioned, and at least one selected from the group consisting of those mentioned above may be used. In addition, as the dispersant, a commercially available product may also be used.

In addition, a method in which particles of the pigment are covered with a resin or the like to impart the dispersibility may also be used. As a method to cover pigment particles, for example, an acid precipitation method, a phase inversion emulsification method, or a mini-emulsion polymerization method may be used.

Although a content of the pigment may be appropriately adjusted in accordance with the application, the content described above with respect to a total mass of the chromatic ink composition is preferably 0.1 to 17.0 percent by mass, more preferably 0.2 to 15.0 percent by mass, further preferably 1.0 to 10.0 percent by mass, and particularly preferably 2.0 to 5.0 percent by mass. When the content of the pigment is in the range described above, an ejection performance when the ejection is performed by an ink jet method tends to be further improved.

In addition, in the chromatic ink composition, as a colorant other than those pigments mentioned above, a dye may also be contained. As the dye, for example, an acidic dye, a reactive dye, or a direct dye may be mentioned.

1.1.1.2. First Resin Particle

The chromatic ink composition used in the printing recording method according to this embodiment contains an anionic first resin particle. In addition, although the resin particle is a particle containing a resin and may be used in the form of either an emulsion or a solution, in order to suppress a viscosity increase of the ink, the resin particle is preferably used in the form of an emulsion. As a resin forming the anionic first resin particle, for example, a resin having an anionic function group may be mentioned, and a resin forming the above resin particle which will be described below may have an anionic group. As the anionic group, for example, there may be mentioned a sulfonic acid group, a carboxy group, a phosphoric acid group, or a hydroxy group may be mentioned, and at least two of those groups mentioned above may also be included. In addition, the first resin particle may contain a resin similar to or different from that of the second resin particle which will be described later.

As the resin, for example, there may be mentioned an urethane resin, a polycarbonate resin, a (meth)acrylic resin, a styrene resin, a silicone resin, a styrene-acrylic resin, a fluorene resin, a polyolefin resin, a rosin-modified resin, a terpene resin, a polyester resin, a polyamide resin, an epoxy resin, a vinyl chloride resin, a vinyl chloride-vinyl acetate copolymer, or an ethylene-vinyl acetate resin. Those resins may be used alone, or at least two types thereof may be used in combination.

The first resin particle contains preferably an urethane resin or a (meth)acrylic resin and more preferably an urethane resin and is further preferably an urethane resin. When the first resin particle contains an urethane resin, since the first resin particle is preferably an urethane resin, this urethane resin is able to react with the cationic compound, such as a cationic polymer, contained in the treatment liquid which will be described later, an aggregation/thickening effect is further facilitated, and the color development property, the rubbing fastness, the bleed-through (bleeding) suppression, and the like can be made more preferable in some cases.

The urethane resin is a resin having an urethane bond in its molecule. As the urethane resin, for example, there may be mentioned a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. At least two of those urethane resins may be used in combination.

As a commercially available product of the urethane resin, for example, there may be mentioned ETERNACOLL UW-1501F, UW-1527F, or UW-5002 (trade name, manufactured by UBE Corporation); Takelac WS-5000, W-6061, W-6110, WS-5984, or WS-5100 (trade name, manufactured by Mitsui Chemicals, Inc.); PERMARIN UA-150 or UA-200, or UCOAT UX-390 (trade name, manufactured by Sanyo Chemical Industries, Ltd.); or HYDRAN WLS-210 (trade name, manufactured by DIC Corporation).

The polycarbonate resin is a resin having a polycarbonate bond in its molecule. When the urethane resin is not used, a polycarbonate resin is preferably used instead.

As a commercially available product of the (meth)acrylic resin, Movinyl 966A or 6760 (trade name, manufactured by Nippon Synthetic Chemical Industry Co., Ltd.) which is an acrylic resin may be mentioned.

The (meth)acrylic resin indicates a resin having a (meth)acrylic skeleton. The (meth)acrylic resin is not particularly limited, and for example, a polymer of a (meth)acrylic-based monomer, such as (meth)acrylic acid or a (meth)acrylate ester, or a copolymer between a (meth)acrylic-based monomer and another monomer may be mentioned. As the another monomer, for example, a vinyl-based monomer, such as styrene, may be mentioned. In addition, in this specification, "(meth)acryl" is a concept including "methacryl" and "acryl".

As a commercially available product of the silicone resin, for example, there may be mentioned POLON-MF014, POLON-MF-18T, POLON-MF-33, or KM-2002-T (trade name, manufactured by Shin-Etsu Chemical Co., Ltd.); or WACKER FINISH WR1100, NP2406, POWERSOFT FE 55, or TS2406 (trade name, manufactured by Asahi Kasei Corporation).

Although an acid value of the resin contained in the first resin particle is not particularly limited, for example, the acid value described above is preferably 1 to 300 KOHmg/g, more preferably 10 to 200 KOHmg/g, and further preferably 20 to 100 KOHmg/g. When the acid value of the resin is in the range described above, the resin particle is likely to be made anionic.

A content of the first resin particle with respect to the total mass of the chromatic ink composition on a solid content basis is preferably 1 percent by mass or more, more preferably 2 to 20 percent by mass, and further preferably 3 to 10 percent by mass. Since the content of the first resin particle is in the range described above, the rubbing fastness and the bleed-through suppression tend to be made more preferable.

1.1.1.3. Organic Solvent

The chromatic ink composition used in the printing recording method according to this embodiment may contain an organic solvent. As the organic solvent, a polyvalent alcohol is preferably contained, and a polyvalent alcohol having a standard boiling point of 250° C. or more is more preferably contained. For example, the type of the organic solvent to be used may be set similar to that of the organic solvent used in the treatment liquid which will be described later.

A content of the polyvalent alcohol having a standard boiling point of 250° C. or more with respect to the total mass of the chromatic ink composition is preferably 1 percent by mass or more, more preferably 5 percent by mass or more, even more preferably 10 percent by mass or more, further preferably 13 percent by mass or more, and particularly preferably 15 percent by mass or more. Although an upper limit of the content described above is not particularly limited, the upper limit described above is preferably 40 percent by mass or less, more preferably 35 percent by mass or less, even more preferably 30 percent by mass or less, further preferably 25 percent by mass or less, and particularly preferably 20 percent by mass or less. When the content of the polyvalent alcohol having a standard boiling point of 250° C. or more is in the range described above, the balance between a moisture retaining property and a drying property is made excellent, and an intermittent printing stability and the rubbing fastness both tend to be made preferable.

1.1.1.4. Water

The chromatic ink composition used in the printing recording method according to this embodiment may contain water. For example, the type of the water to be used may be set similar to that of the water used in the treatment liquid which will be described later.

A content of the water with respect to the total mass of the chromatic ink composition is preferably 30 percent by mass or more, more preferably 40 percent by mass or more, even more preferably 50 percent by mass or more, further preferably 60 percent by mass or more, particularly preferably 65 percent by mass or more, and more particularly preferably 70 percent by mass or more. When the content of the eater is in the range described above, the viscosity of the chromatic ink composition can be made relatively low. In addition, an upper limit of the content of the water with respect to the total mass of the chromatic ink composition is preferably 90 percent by mass or less, more preferably 85 percent by mass or less, and further preferably 80 percent by mass or less.

1.1.1.5. Surfactant

The chromatic ink composition used in the printing recording method according to this embodiment may contain a surfactant. As the surfactant as described above, a surfactant similar to that contained in the treatment liquid which will be described later may be used, and the content thereof may also be set similar to that in the treatment liquid.

1.1.1.6. pH Adjuster

The chromatic ink composition used in the printing recording method according to this embodiment may contain a pH adjuster. Although the pH adjuster is not particularly limited, an appropriate combination among an acid, a base, a weak acid, a weak base, and the like may be mentioned. As examples of an acid and a base to be used for the combination as described above, as an inorganic acid, for example, sulfuric acid, hydrochloric acid, or nitric acid may be mentioned; as an inorganic base, for example, lithium hydroxide, sodium hydroxide, potassium hydroxide, potassium dihydrogen phosphate, sodium dihydrogen phosphate, potassium carbonate, sodium carbonate, sodium hydrogen carbonate, or ammonia may be mentioned; as an organic base, for example, triethanolamine (TEA), diethanolamine, monoethanolamine, tripropanolamine, triisopropanolamine, diisopropanolamine, or tris(hydroxymethyl)aminomethane (THAM) may be mentioned; and as an organic acid, for example, adipic acid, citric acid, succinic acid, lactic acid, a good buffer, such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetoamide)-2-aminoethanesulfonic acid (ACES), colamine hydrochloride, N-tris(hydroxymethyl)methyl-2-aminoethanesulfonic acid (TES), acetamidoglycine, tricine, glycinamide, or bicine, a phosphate buffer solution, a citrate buffer solution, or a tris buffer solution may be mentioned.

In the chromatic ink composition, the pH adjuster may be used alone, or at least two types thereof may be used in combination. In addition, when the pH adjuster is used, a total content thereof with respect to the total mass of the chromatic ink composition is, for example, 0.05 to 3.0 percent by mass and is more preferably 0.1 to 1.0 percent by mass.

1.1.1.7. Other Components

The chromatic ink composition used in the printing recording method according to this embodiment may appropriately contain various types of additives, such as an antiseptic/antibacterial agent including 1,2-dibenzisothiazoline-3-one, a sequestering agent including disodium dihydrogen ethylenediaminetetraacetate, a softener, a solubilizing agent, a viscosity adjuster, an ultraviolet absorber, an antioxidant, and/or a corrosion inhibitor.

1.1.1.8. Manufacturing and Physical Properties of Chromatic Ink Composition The chromatic ink composition used in the printing recording method according to this embodiment can be obtained, for example, such that the components described above are mixed together in an arbitrary order, and impurities are then removed by filtration or the like if needed. As a method of mixing the components, a method in which the materials are sequentially added in a container equipped with a stirring device, such as a mechanical stirrer or a magnetic stirrer, and are then mixed together by stirring may be preferably used.

In view of the reliability when the ejection is performed by an ink jet method, the chromatic ink composition used in the printing recording method according to this embodiment has a surface tension at 20° C. of preferably 20 to 40 mN/m and more preferably 22 to 35 mN/m. In addition, from the same point as described above, the chromatic ink composition described above has a viscosity at 20° C. of preferably 8 mPa·s or less, more preferably 7 mPa·s or less, further preferably 6 mPa·s or less, and particularly preferably 5 mPa·s or less. In addition, in order to set the surface tension and the viscosity of the chromatic ink composition in the respective ranges described above, for example, the types of the organic solvent and the surfactant described above, the addition amounts thereof, and the addition amount of the water may be appropriately adjusted.

1.2. Treatment Liquid Adhesion Step

The printing recording method according to this embodiment is a method including a treatment liquid adhesion step of adhering a liquid droplet of a treatment liquid containing a cationic compound to a cloth.

An adhesion amount of the treatment liquid per unit area of the recording region of the cloth is preferably 10 to 21 mg/inch$^2$, more preferably 12 to 20 mg/inch$^2$, further preferably 14 to 19 mg/inch$^2$, and particularly preferably 15 to 18 mg/inch$^2$. When the adhesion amount of the treatment liquid is in the range described above, the rubbing fastness, the bleed-through suppression, and the color development property tend to be made preferable with a good balance.

1.2.1. Treatment Liquid

The treatment liquid used in the printing recording method according to this embodiment is a liquid containing a cationic compound. Hereinafter, components contained in the treatment liquid will be described.

In addition, unlike the chromatic ink composition described above to be used to color the cloth and the achromatic ink composition (overcoating liquid) described below to be used to protect a printed portion, the treatment liquid is an auxiliary liquid to be used together with the ink compositions described above. In addition, the treatment liquid is preferably a liquid which can aggregate or thicken the components of the chromatic ink composition and the achromatic ink composition (hereinafter, when the above two ink compositions are not particularly discriminated from each other, they are each simply called "ink composition" or "ink" in some cases) and is more preferably a liquid which contains a component to aggregate or thicken the components of the ink compositions described above. Although the treatment liquid may contain the colorant described above, a content thereof with respect to a total mass of the treatment liquid is preferably 0.2 percent by mass or less, more preferably 0.1 percent by mass or less, and further preferably 0.05 percent by mass or less, and a lower limit of the content described above is 0 percent by mass. The treatment liquid preferably contains no colorant.

1.2.1.1. Cationic Compound

The treatment liquid used in the printing recording method according to this embodiment contains a cationic compound. As the cationic compound, a compound is not particularly limited as long as causing the thickening/aggregation by a reaction with an anionic component, such as the first resin particle contained in the chromatic ink composition and/or the second resin particle contained in the achromatic ink composition. However, in order to further improve the color development property and a wet rubbing fastness, the cationic compound preferably contains at least one selected from the group consisting of a polyvalent metal salt and a cationic polymer.

Polyvalent Metal Salt

When being in contact with the ink composition, the polyvalent metal salt has an excellent function to cause the thickening/aggregation of the component of the ink composition and tends to improve the color development property by aggregating the ink in the vicinity of the surface of the cloth.

The polyvalent metal salt is a compound formed from an at least divalent metal ion and an anion. As the at least divalent metal ion, for example, an ion of calcium, magnesium, copper, nickel, zinc, barium, aluminum, titanium, strontium, chromium, cobalt, iron, or the like may be mentioned. Among those metal ions each forming a polyvalent metal salt, since having an excellent aggregation property of the component of the ink, at least one selected from the group consisting of a calcium ion and a magnesium ion is preferable. Furthermore, in view of the balance between the aggregation property and the rubbing fastness, a magnesium ion is more preferable.

As the anion forming the polyvalent metal salt, an inorganic ion or an organic ion may be mentioned. That is, the polyvalent metal salt in this specification is a salt formed from a polyvalent metal and an inorganic ion or an organic ion. As the inorganic ion as described above, for example, a chloride ion, a bromide ion, an iodide ion, a nitrate ion, a sulfate ion, or a hydroxide ion may be mentioned. As the organic ion, an organic acid ion may be mentioned, and for example, a carboxylate ion may be mentioned.

The polyvalent metal salt is preferably a magnesium salt. For example, when the polyvalent metal salt is a calcium salt, although the aggregation property is excellent, an aggregation reaction is difficult to control, and the rubbing fastness and granular quality on the cloth may be inferior in some cases. On the other hand, compared to other salts, such as a calcium salt, in the case of a magnesium salt, since an aggregation reaction with the ink is mild, the reaction can be easily controlled. Hence, the color development property can be made preferable, and in addition, the rubbing fastness and the granular quality also tend to be made preferable. In addition, as a counter ion of the polyvalent metal, either an inorganic acid ion or an organic acid ion may be used.

Although a concrete example of the polyvalent metal salt is not particularly limited, for example, there may be mentioned calcium carbonate, such as heavy calcium carbonate or light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminium silicate, calcium silicate, magnesium silicate, copper nitrate, calcium acetate, magnesium acetate, or aluminum acetate. Those polyvalent metal salts may be used alone, or at least two types thereof may be used in combination. Among those mentioned above, since the color development property can be made preferable, and in addition, since the rubbing fastness and the granular quality can also be made preferable, at least one selected from the group consisting of magnesium chloride, magnesium sulfate, magnesium carbonate, magnesium silicate, and magnesium acetate is preferable. In addition, those metal salts each may contain hydrated water in the form of a raw material.

When the polyvalent metal salt is contained, a lower limit of a content of the polyvalent metal salt with respect to the total mass of the treatment liquid is preferably 0.5 percent by mass or more, more preferably 1.0 percent by mass or more, even more preferably 1.5 percent by mass or more, further preferably 2.0 percent by mass or more, and particularly preferably 2.5 percent by mass or more. In addition, an upper limit of the content of the polyvalent metal salt with respect to the total mass of the treatment liquid is preferably 10 percent by mass or less, more preferably 8 percent by mass or less, even more preferably 6 percent by mass or less, further preferably 5 percent by mass or less, even further preferably 4 percent by mass or less, and particularly preferably 3.5 percent by mass or less. When the content of the polyvalent metal salt is in the range described above, the color development property and the rubbing fastness tend to be made more preferable with a good balance.

Cationic Polymer

The cationic polymer indicates a polymer having a cationic property. Accordingly, when being in contact with the ink composition, the cationic polymer has a function to aggregate the component of the ink composition.

In addition, the cationic polymer preferably has a cross-linking group and more preferably has a cross-linking group to react with a hydroxy group. When the cationic polymer is the polymer as described above, since a cross-linking reaction occurs with a hydroxy group which can be included in the anionic resin particle contained in the ink composition, the thickening/aggregation of the ink are likely to be performed, and the color development property can be further improved, and in addition, since the ink layer and the coating liquid layer are made tougher by the cross-linking of the resin, a more preferable rubbing fastness (in particular, wet rubbing fastness) tends to be obtained. In addition, when the cloth is made from cotton or the like, since a cross-linking reaction occurs between the cationic polymer to react with a hydroxy group and a hydroxy group of cellulose of the cotton, the adhesion between the cloth and the ink layer is further improved, and a more preferable rubbing fastness (in particular, wet rubbing fastness) tends to be obtained.

As the cationic polymer, for example, at least one selected from the group consisting of a polyamide-epichlorohydrin resin, a polyamine-epichlorohydrin resin, a melamine resin, a blocked isocyanate resin, an oxazoline, and a carbodiimide is preferable. Among those mentioned above, the cationic polymer is more preferably a polyamide-epichlorohydrin resin. When at least one of those cationic polymers is used, the rubbing fastness and the color development property tend to be made more excellent.

The polyamide-epichlorohydrin resin functioning as the cationic polymer is a polymer obtained, for example, by a method in which an addition reaction is performed between a polyamide and epichlorohydrin or a method in which monomers including an amine, a carboxylic acid, and epichlorohydrin are polymerized with each other. In addition, a polyamidepolyamine-epichlorohydrin copolymer is regarded to be included in the polyamide-epichlorohydrin resin. As a commercially available product of the polyamide-epichlorohydrin resin functioning as the cationic polymer, for example, there may be mentioned Kymene 557 (manufactured by SOLENIS), WS-4020, 4030, or 4027, or TS-4070 (manufactured by Seiko PMC Corporation), or AF-100, 251S, 255, 255LOX, or 2500 (manufactured by Arakawa Chemical Industries, Ltd.).

The polyamine-epichlorohydrin resin functioning as the cationic polymer is a polymer obtained, for example, by a method in which an addition reaction is performed between a polyamine and epichlorohydrin or a method in which monomers including an amine, such as dimethylamine, and epichlorohydrin are polymerized with each other. As a commercially available product of the polyamine-epichlorohydrin resin functioning as the cationic polymer, Unisense KHE107L (manufactured by Senka Corporation) or WS-4011 (manufactured by Seiko PMC Corporation) may be mentioned.

As the melamine resin functioning as the cationic polymer, for example, a butylated melamine or a fully-etherized melamine may be mentioned. The melamine resin is preferably water soluble. As a commercially available product of the melamine resin functioning as the cationic polymer, for example, Miliogene P-20 (manufactured by Senka Corporation) or Sumirez (registered trademark) Resin 8% AC (manufactured by Taoka Chemical Company, Limited) may be mentioned.

The blocked isocyanate resin functioning as the cationic polymer is a resin having an isocyanate group inactivated by a blocking agent. The blocked isocyanate resin preferably has at least two isocyanate groups, and at least one isocyanate group is inactivated by a blocking agent. When being heated to a temperature equal to or higher than a cross-linking reaction start temperature, the blocked isocyanate resin forms an urethane bond by a reaction with a hydroxy group which can be included in the resin particle. The reason for this is that since a blocking agent inactivating the isocyanate group of the blocked isocyanate resin is dissociated by heating to a predetermined temperature or more, the isocyanate group is activated, and as a result, a cross-linking reaction proceeds. As the blocked isocyanate resin functioning as the cationic polymer, for example, a polymer obtained by blocking a TMP (trimethylolpropane) adduct or an isocyanurate of HDI (hexamethylene diisocyanate), H6XDI (hydrogenated xylylene diisocyanate), IPDI (isophorone diisocyanate), or H12MDI (dicyclohexylmethane diisocyanate) is preferably used. As a commercially available product of the blocked isocyanate resin, for example, there may be mentioned Fixer #220 (manufactured by Murayama Chemical Laboratory Co., Ltd.), SU-268A (manufactured by Meisei Chemical Works, Ltd.), or MF-B60B (manufactured by Asahi Kasei Corporation). Those are each the cationic polymer.

In addition, although the blocking agent is not particularly limited, for example, dimethylpyrazole, diethylmalonate, methyl ethyl ketoxime, ε-caprolactam, or 1,2,4-triazole may be mentioned. Among those mentioned above, dimethylpyrazole or methyl ethyl ketoxime is preferable.

As the oxazoline functioning as the cationic polymer, for example, a polymer obtained by homopolymerization of an oxazoline group-containing ethylenic unsaturated monomer, such as 2-isopropenyl-2-oxazoline or 2-vinyl-2-oxazoline, or a polymer obtained by copolymerization between one of the above unsaturated monomers and another unsaturated monomer may be mentioned. As the oxazoline functioning as the cationic polymer, a commercially available product may also be used, and for example, "Epocros WS500" or "Epocros K201E" (trade name, manufactured by Nippon Shokubai Co., Ltd.) may be mentioned.

As the carbodiimide functioning as the cationic polymer, for example, a compound having at least two carbodiimide groups in its molecule may be mentioned, and a polypropylcarbodiimide compound is preferable. As the carbodiimide functioning as the cationic polymer, a commercially available product may also be used, and for example, "Carbodilite V-02" (trade name, manufactured by Nisshinbo Co., Ltd.) may be mentioned.

A mass average molecular weight of the cationic polymer is preferably 100,000 or less, more preferably 80,000 or less, even more preferably 60,000 or less, further preferably 40,000 or less, and particularly preferably 20,000 or less. Although a lower limit of the mass average molecular weight of the cationic polymer is not particularly limited, for example, the lower limit described above is preferably 100 or more, more preferably 1,000 or more, and further preferably 5,000 or more. When the mass average molecular weight of the cationic polymer is 100,000 or less, the ejection performance tends to be made more preferable when the treatment liquid is applied by an ink jet method. In addition, the mass average molecular weight can be measured by a gel permeation chromatography (GPC measurement apparatus) using a poly(ethylene glycol) as a standard polymer.

When the cationic polymer is contained, a content of the cationic polymer with respect to the total mass of the treatment liquid is preferably 1 to 10 percent by mass, more preferably 3 to 9 percent by mass, even more preferably 4 to 8 percent by mass, further preferably 5 to 7 percent by mass, and particularly preferably 6 to 7 percent by mass. When the content of the cationic polymer is in the range described above, the balance between the printing quality, such as the rubbing fastness, the color development property, and the bleeding (bleed-through) suppression, and the ejection performance when the treatment liquid is applied by an ink jet method tends to be made more excellent.

1.2.1.2. Organic Solvent

Polyvalent Alcohol

The treatment liquid used in the printing recording method according to this embodiment preferably contains a polyvalent alcohol as an organic solvent.

The polyvalent alcohol is an alcohol having preferably at least one hydroxy group in its molecule, more preferably at least two hydroxy groups in its molecule, and furthermore preferably at least three hydroxy groups in its molecule. As the polyvalent alcohol, for example, an alcohol, an alkanediol, a polyol, an alkylene glycol monoalkyl ether, or the like may be mentioned. Among those mentioned above, the polyvalent alcohol is preferably at least one selected from the group consisting of a polyol and an alkylene glycol monoalkyl ether and is more preferably a polyol. In addition, although the state of a polyvalent alcohol at ordinary temperature and ordinary pressure may be either a liquid or a solid, the state described above is preferably a liquid.

As the alcohol, for example, a compound in which one hydrogen atom of an alkane is replaced by a hydroxy group may be mentioned. The alkane may have either a linear or a branched structure. As the alcohol, for example, there may be mentioned methanol, ethanol, n-propyl alcohol, isopropyl alcohol, n-butanol, 2-butanol, tert-butanol, iso-butanol, n-pentanol, 2-pentanol, 3-pentanol, or tert-pentanol.

As the alkanediol, for example, a compound in which two hydrogen atoms of an alkane are replace by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which at least two alkanediol molecules are intermolecular condensed between hydroxy groups or a compound having at least three hydroxy groups may be mentioned.

As the condensate in which at least two alkanediol molecules are intermolecular condensed between hydroxy groups, for example, there may be mentioned a dialkylene glycol, such as diethylene glycol or dipropylene glycol, or a trialkylene glycol, such as triethylene glycol (standard boiling point: 287° C.) or tripropylene glycol.

As the compound having at least three hydroxy groups, a compound having an alkane structure or a polyether structure as a skeleton and at least three hydroxy groups may be mentioned. As the compound having at least three hydroxy groups, for example, there may be mentioned glycerin (standard boiling point: 290° C.), trimethylolethane, trimethylolpropane, 1,2,5-hexanetriool, 1,2,6-hexanetriool, pentaerythritol, or a polyoxypropylene triol.

As the alkylene glycol monoalkyl ether, for example, there may be mentioned ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (BTG, standard boiling point: 278° C.), tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether.

The treatment liquid used in the printing recording method according to this embodiment more preferably contains a polyvalent alcohol having a standard boiling point of 250° C. or more. Accordingly, the moisture retaining property of the treatment liquid is made preferable, and even if the cationic polymer is contained, the ejection stability tends to be made preferable. In addition, in view of suppression of the VOC (volatile organic compounds) problem, the standard boiling point of the polyvalent alcohol is preferably 250° C. or more.

Among the polyvalent alcohols having a standard boiling point of 250° C. or more, as the polyol having a standard boiling point of 250° C. or more, for example, triethylene glycol (standard boiling point: 287° C.), trimethylolpropane (standard boiling point: 295° C.), or glycerin (standard boiling point: 290° C.) may be mentioned. As the alkylene glycol monoalkyl ether having a standard boiling point of 250° C. or more, for example, triethylene glycol monobutyl ether (BTG, standard boiling point: 278° C.), triethylene glycol monoethyl ether (standard boiling point: 255° C.), or tetraethylene glycol monobutyl ether (standard boiling point: 290° C. or more) may be mentioned. Among those mentioned above, as the polyvalent alcohol having a standard boiling point of 250° C. or more, at least one selected from the group consisting of triethylene glycol, glycerin, and triethylene glycol monobutyl ether is preferable, and glycerin is more preferable. When at least one of the compounds described above is used, the moisture retaining property is made more preferable, and the intermittent printing stability tends to be made more preferable. In addition, from the same point as described above, in the polyvalent alcohol having a standard boiling point of 250° C. or more, the standard boiling point thereof is preferably 260° C. or more, more preferably 270° C. or more, further preferably 280° C. or more, and particularly preferably 285° C. or more.

Although a content of the polyvalent alcohol having a standard boiling point of 250° C. or more is not particularly limited, the content described above with respect to the total mass of the treatment liquid is preferably 1 percent by mass or more, more preferably 5 percent by mass or more, even more preferably 10 percent by mass or more, further preferably 13 percent by mass or more, particularly preferably 15 percent by mass or more, and more particularly preferably 18 percent by mass or more. Although an upper limit of the content described above is not particularly limited, the upper limit described above is preferably 40 percent by mass or less, more preferably 35 percent by mass or less, further preferably 30 percent by mass or less, and particularly preferably 25 percent by mass or less, and more particularly preferably 22 percent by mass or less. When the content of the polyvalent alcohol having a standard boiling point of 250° C. or more is in the range described above, the balance between the moisture retaining property and the drying property is made excellent, and the intermittent printing stability and the rubbing fastness both tend to be made preferable.

Other Organic Solvent

The treatment liquid used in the printing recording method according to this embodiment may also contain an organic solvent other than the polyvalent alcohol described above. As the organic solvent as described above, for example, an ester, an alkylene glycol dialkyl ether, a cyclic ester, or a nitrogen-containing solvent may be mentioned. As the nitrogen-containing solvent, for example, a cyclic amide or an acyclic amide may be mentioned. As the acyclic amide, for example, an alkoxyalkylamide may be mentioned.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the alkylene glycol dialkyl ether, for example, there may be mentioned ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone; or a compound in which a hydrogen atom of a methylene group adjacent to the carbonyl group of one of those mentioned above is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, 3-methoxy-N,N- methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the cyclic amide, a lactam may be mentioned, and for example, a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone may be mentioned.

The organic solvent may be used alone, or at least two types thereof may be used in combination.

1.2.1.3. Water

The treatment liquid used in the printing recording method according to this embodiment may contain water. As the water, for example, there may be mentioned pure water, such as ion exchange water, ultrafiltration water, reverse osmosis water, or distilled water, or water, such as ultrapure water, in which ionic impurities are removed as much as possible. In addition, if water sterilized by UV radiation, addition of hydrogen peroxide, or the like is used, the generation of bacteria and fungi can be suppressed when the reaction liquid is stored for a long time.

A content of the water with respect to the total mass of the treatment liquid is preferably 30 percent by mass or more, more preferably 40 percent by mass or more, even more preferably 45 percent by mass or more, further preferably 50 percent by mass or more, particularly preferably 55 percent by mass or more, and more particularly preferably 60 percent by mass or more. When the content of the water is in the range described above, the treatment liquid can be made to have a relatively low viscosity. In addition, an upper limit of the content of the water with respect to the total mass of the treatment liquid is preferably 90 percent by mass or less, more preferably 85 percent by mass or less, and further preferably 80 percent by mass or less.

1.2.1.4. Surfactant

The treatment liquid used in the printing recording method according to this embodiment may contain a surfactant. The surfactant is not particularly limited, and for example, an acetylene glycol-based surfactant, a fluorine-based surfactant, or a silicone-based surfactant may be mentioned. At least one of those mentioned above is preferably contained, and among those mentioned above, an acetylene glycol-based surfactant is more preferably contained.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products and Chemicals, Inc.), Olfine B, Y, P, A, STG, SPC, E1004, E1010, PD-001, PD-002W, PD-003, PD-004, EXP.4001, EXP.4036, EXP. 4051, AF-103, AF-104, AK-02, SK-14, or AE-3 (trade name, manufactured by Nisshin Chemical Industry Co., Ltd.), or Acetylenol E00, E00P, E40, or E100 (trade name, manufactured by Kawaken Fine Chemicals Co., Ltd.).

Although the silicone-based surfactant is not particularly limited, for example, a polysiloxane-based compound is preferably mentioned. Although the polysiloxane-based compound is not particularly limited, for example, a polyether modified organosiloxane may be mentioned. As a commercially available product of the polyether modified organosiloxane, for example, there may be mentioned BYK-306, BYK-307, BYK-333, BYK-341, BYK-345, BYK-346, or BYK-348 (trade name, manufactured by BYK Japan KK), or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, a fluorine modified polymer is preferably used, and as a concrete example, BYK-340 (trade name, manufactured by BYK Japan KK) may be mentioned.

When the surfactant is contained, a content thereof with respect to the total mass of the treatment liquid may be set to 0.1 to 1.5 percent by mass and is preferably 0.5 to 1 percent by mass.

1.2.1.5. Antiseptic/Antibacterial Agent

The treatment liquid used in the printing recording method according to this embodiment may contain an antiseptic/antibacterial agent. As the antiseptic/antibacterial agent, for example, there may be mentioned sodium benzoate, sodium pentachlorophenol, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL-2, Proxel TN, or Proxel LV, manufactured by Lonza Japan), or 4-chloro-3-methylphenol (such as Preventol CMK, manufactured by Bayer).

When the antiseptic/antibacterial agent is contained, a content thereof with respect to the total mass of the treatment liquid is set, for example, to 0.05 to 1.0 percent by mass and is preferably set to 0.1 to 0.5 percent by mass.

1.2.1.6. Other Components

As components other than those mentioned above, the treatment liquid used in the printing recording method according to this embodiment may appropriately contain, for example, various types of additives, such as an alkali compound (pH adjuster) including triethanolamine, a sequestering agent such as disodium dihydrogen ethylenediamine tetraacetate, a softener, a solubilizing agent, a viscosity adjuster, an ultraviolet absorber, an antioxidant, and/or a corrosion inhibitor.

1.2.1.7. Manufacturing Method and Physical Properties of Treatment Liquid

The treatment liquid used in the printing recording method according to this embodiment can be obtained, for example, such that the components described above are mixed together in an arbitrary order, and impurities are removed by filtration or the like if needed. As a mixing method of the components, there may be used a method in which after the materials are sequentially added in a container equipped with a stirring device, such as a mechanical stirrer or a magnetic stirrer, mixing is performed by stirring.

In view of the reliability when the ejection is performed by an ink jet method, the treatment liquid used in the printing recording method according to this embodiment has a surface tension at 20° C. of preferably 20 to 40 mN/m and more preferably 22 to 35 mN/m. In addition, from the same point as described above, a viscosity of the treatment liquid at 20° C. is preferably 8 mPa·s or less, more preferably 7 mPa·s or less, further preferably 6 mPa·s or less, and particularly preferably 5 mPa·s or less. In addition, when the surface tension and the viscosity are set in the respective ranges described above, for example, the types and the addition amounts of the organic solvent and the surfactant described above and the addition amount of the water may be appropriately adjusted.

In addition, as the surface tension, a value measured by Wilhelmy method may be used. The measurement of the surface tension can be performed, for example, using a surface tensiometer, such as CBVP-7, manufactured by Kyowa Interface Science Co., Ltd. In addition, the viscosity can be measured at 20° C., for example, such that by using a viscoelastic test device, such as MCR-300, manufactured by Pysica, a shear rate is increased from 10 $[s^{-1}]$ to 1,000 $[s^{-1}]$, and a viscosity at a shear rate of 200 $[S^{-1}]$ is read.

1.3. Achromatic Ink Adhesion Step

The printing recording method according to this embodiment includes an achromatic ink adhesion step of adhering a liquid droplet of an achromatic ink composition which contains an anionic second resin particle to a cloth.

An adhesion amount of the achromatic ink composition per unit are of the recording region of the cloth is preferably 10 to 21 mg/inch$^2$, more preferably 12 to 20 mg/inch$^2$, even more preferably 14 to 19 mg/inch$^2$, and further preferably 15 to 18 mg/inch$^2$. When the adhesion amount of the achromatic ink composition is in the range described above, the rubbing fastness, the bleed-through suppression, and the color development property tend to be made more preferable with a good balance.

1.3.1. Achromatic Ink Composition

The achromatic ink composition used in the printing recording method according to this embodiment contains an anionic second resin particle. Hereinafter, components contained in the achromatic ink composition will be described.

In addition, unlike the above chromatic ink composition used for coloration of the cloth and the above treatment liquid, in order to improve the fastness, such as the rubbing fastness and/or a washing fastness, the achromatic ink composition (hereinafter, referred to as "overcoating liquid" or "coating liquid") in some cases) is used to protect the printed portion of the cloth or the like after being applied thereto. Although the achromatic ink composition may contain the colorant described above, the content thereof with respect to a total mass of the achromatic ink composition is preferably 0.2 percent by mass or less, more preferably 0.1 percent by mass or less, and further preferably 0.05 percent by mass or less, and an upper limit thereof is 0 percent by mass. The achromatic ink composition preferably contains no colorant.

1.3.1.1. Second Resin Particle

The achromatic ink composition used in the printing recording method according to this embodiment contains an anionic second resin particle. The second resin particle has the same structure as that of the first resin particle contained in the chromatic ink composition described above. In addition, the second resin particle may contain a resin similar to or different from the resin of the first resin particle described above.

As is the first resin particle described above, the second resin particle contains preferably an urethane resin or a (meth)acrylic resin and more preferably an urethane resin and is further preferably an urethane resin. When the second resin particle contains an urethane resin, since the second resin particle is preferably an urethane resin, this urethane resin is able to react with the cationic compound, such as a cationic polymer, contained in the treatment liquid described above, the aggregation/thickening effect is further facilitated, the coating liquid layer is further made tougher thereby, and the rubbing fastness, the bleed-through (bleeding) suppression, and the like can be made more preferable in some cases.

A content of the second resin particle with respect to the total mass of the achromatic ink composition on a solid content basis is preferably 2 percent by mass or more, more preferably 3 to 30 percent by mass, even more preferably 4 to 20 percent by mass, further preferably 5 to 15 percent by mass, and particularly preferably 7 to 13 percent by mass. Since the content of the second resin particle is in the range described above, the rubbing fastness and the bleed-through suppression tend to be made more preferable.

1.3.1.2. Organic Solvent

The achromatic ink composition used in the printing recording method according to this embodiment may contain an organic solvent. As the organic solvent, a polyvalent alcohol is preferable, and a polyvalent alcohol having a standard boiling point of 250° C. or more is more preferable. For example, the type of the organic solvent to be used may be similar to that of the treatment liquid described above.

A content of the polyvalent alcohol having a standard boiling point of 250° C. or more in the achromatic ink composition with respect to the total mass thereof is preferably 1 percent by mass or more, more preferably 5 percent by mass or more, even more preferably 10 percent by mass or more, further preferably 15 percent by mass or more, particularly preferably 20 percent by mass or more, and more particularly preferably 22 percent by mass or more. Although an upper limit of the content described above is not particularly limited, the upper limit is preferably 50 percent by mass or less, more preferably 40 percent by mass or less, even more preferably 30 percent by mass or less, further preferably 28 percent by mass or less, and particularly preferably 26 percent by mass or less. When the content of the polyvalent alcohol having a standard boiling point of 250° C. or more is in the range described above, the balance between the moisture retaining property and the drying property is made excellent, and the intermittent printing stability and the rubbing fastness both tend to be made preferable.

1.3.1.3. Water

The achromatic ink composition used in the printing recording method according to this embodiment may contain water. For example, the type of the water to be used may be similar to that of the treatment liquid described above.

A content of the water with respect to the total mass of the achromatic ink composition is preferably 20 percent by mass or more, more preferably 30 percent by mass or more, even more preferably 40 percent by mass or more, further preferably 50 percent by mass or more, particularly preferably 55 percent by mass or more, and more particularly preferably 60 percent by mass or more. When the content of the water is in the range described above, the achromatic ink composition can be made to have a relatively low viscosity. In addition, an upper limit of the content of the water with respect to the total mass of the achromatic ink composition is preferably 90 percent by mass or less, more preferably 80 percent by mass or less, and further preferably 70 percent by mass or less.

1.3.1.4. Surfactant

The achromatic ink composition used in the printing recording method according to this embodiment may contain a surfactant. As the surfactant as described above, a surfactant similar to that contained in the treatment liquid described above may be used, and a content thereof may also be set similar to that described above.

1.3.1.5 pH Adjuster

The achromatic ink composition used in the printing recording method according to this embodiment may contain a pH adjuster. As the pH adjuster as described above, a pH adjuster similar to that contained in the chromatic ink composition may be used, and a content thereof may also be set similar to that described above.

1.3.1.6. Other Components

The achromatic ink composition used in the printing recording method according to this embodiment may appropriately contain various additives, such as an antiseptic/antibacterial agent including 1,2-dibenzisothiazoline-3-one, a sequestering agent including disodium dihydrogen ethylenediaminetetraacetate, a softener, a solubilizing agent, a viscosity adjuster, an ultraviolet absorber, an antioxidant, and/or a corrosion inhibitor.

1.3.1.7. Manufacturing and Physical Properties of Achromatic Ink Composition The achromatic ink composition used in the printing recording method according to this embodiment can be manufactured in a manner similar to that of the chromatic ink composition described above, and the physical properties, such as the surface tension and the viscosity, at 20° C. can also be set similar to those of the chromatic ink composition described above.

1.4. Other Steps

The printing recording method according to this embodiment may includes, after the treatment liquid adhesion step, the chromatic ink adhesion step, and the achromatic ink adhesion step described above, a step of heating the cloth. A heating method is not particularly limited, and for example, a heat press method, an ordinary pressure steam method, a high pressure steam method, or a thermofix method may be mentioned. A heat source of the heating is not particularly limited, and for example, an infrared lamp may be used. A heating temperature is preferably a temperature at which the first resin particle and the second resin particle are fusion-bonded and at which a medium such as moisture is evaporated. For example, the heating temperature is preferably 100° C. to 200° C., more preferably 170° C. or less, and further preferably 160° C. or less. In this embodiment, the heating temperature in the heating step indicates a surface temperature of an image or the like formed on the cloth. A heating time is not particularly limited, and for example, the heating time is 30 seconds to 20 minutes.

After the heating step is performed, steps of washing and drying the cloth on which printing is performed may also be included. In the washing, if needed, as a soaping treatment, the components of the ink or the like not fixed to the cloth may be washed out using a hot soap solution or the like.

1.5. Adhesion Form

The treatment liquid adhesion step, the chromatic ink adhesion step, and the achromatic ink adhesion step described above of the printing recording method according to this embodiment are performed by an ink jet method, and the ink jet method is a method in which a main scanning to perform recording by transferring an ink jet head in a direction perpendicular to a transport direction of the cloth is carried out a plurality of times.

In addition, the ink jet method is a recording method in which a liquid droplet of an ink or the like is ejected from a nozzle of an ink jet head of an ink jet recording apparatus or the like so as to be applied to a recording medium. In addition, for example, in the recording apparatus shown in FIG. 1, the main scanning to perform recording by transferring an ink jet head in a direction perpendicular to a transport direction of a cloth is a scanning to perform recording while a carriage 43 of an ink jet head 42 is reciprocally transferred in a direction (Y axis direction) perpendicular to a transport direction (+X axis direction) of a cloth 95.

The number of main scannings is not particularly limited, and for example, the number described above is 2 or more, preferably 4 or more, and more preferably 8 or more. In addition, an upper limit of the number of main scannings is also not particularly limited, and for example, the upper limit described above is preferably 32 or less and more preferably 16 or less.

1.5.1. Simultaneous Adhesion Step

The printing recording method according to this embodiment includes a simultaneous adhesion step of adhering the treatment liquid and the chromatic ink composition described above by the same main scanning to the same scanning region of the cloth. By the simultaneous adhesion step, since a layer including the treatment liquid and the chromatic ink composition can be formed by the same main scanning, the two compounds described above are likely to be mixed together and are also likely to react to each other. Accordingly, since the thickening/aggregation of the ink is further facilitated, and the ink component is likely to stay in the vicinity of the surface of the cloth, it is considered that the bleed-through is suppressed thereby, and the color development property is also made preferable.

In the simultaneous adhesion step, the same main scanning is preferably performed a plurality of times on the same scanning region. In the case described above, after a layer including the chromatic ink composition and the treatment liquid is adhered to a certain region on the cloth by one main scanning, another layer including the chromatic ink composition and the treatment liquid can be adhered to and laminated on the certain region described above by another main scanning. As a result, since the treatment liquid and the chromatic ink composition are alternately laminated to each other (overlapped in the form of mille-feuille), the components of the two compounds described above are likely to be mixed with each other and are also likely to react to each other. Accordingly, since the thickening/aggregation of the ink is further facilitated, and the ink component is likely to stay in the vicinity of the surface of the cloth, the bleed-through can be suppressed thereby, and the color development property also tends to be made more preferable.

In addition, when the same main scanning is performed a plurality of times on the same scanning region, the main scanning to adhere the chromatic ink composition and the treatment liquid passes a plurality of times on the same region of the cloth. As the number of scannings is increased, the chromatic ink composition and the treatment liquid can be adhered a plurality of times (passes) to a desired region, and hence, an image of a recorded matter to be obtained tends to be further improved.

In addition, when recording is performed on an arbitrary region, the number of passing times of an ink jet head on the region described above is also called "pass(es)" in some cases. For example, when the main scanning to adhere the chromatic ink composition and the treatment liquid is performed 4 times on the same region, the pass number is called four passes. For example, in FIG. 2, when the length of one sub-scanning in a sub-scanning direction (+X axis direction) is one fourth of the length of a nozzle line in the sub-scanning direction (+X axis direction), four scannings are performed on a rectangular scanning region having a length of the one sub-scanning in the sub-scanning direction (+X axis direction) and extending in the main scanning direction (Y axis direction). The number of scannings calculated as described above is called a scanning number or a pass number. The number of scannings in the simultaneous adhesion step is 1 or more, preferably 2 or more, more preferably 3 or more, and further preferably 4 or more. In addition, an upper limit of the number of scannings in the simultaneous adhesion step is not particularly limited, and for example, the upper limit described above is preferably 12 or less and more preferably 8 or less. By the printing recording method according to this embodiment, even when the number of scannings in the simultaneous adhesion step is in the range described above, preferable color development property and rubbing fastness can be obtained, and in addition, a preferable bleeding (bleed-through) suppression tends to be obtained.

In addition, in the simultaneous adhesion step, by a main scanning different from the main scanning forming the layer including the chromatic ink composition and the treatment liquid, a layer including the treatment liquid is formed, and the layer including the chromatic ink composition and the treatment liquid and the layer including the treatment liquid may be formed so as to be laminated to each other. As described above, since the layer including the treatment liquid is formed, the color development property and the rubbing fastness are made more excellent in some cases. Although the formation of the layer including the treatment liquid may be performed either before or after the formation of the layer including the chromatic ink composition and the treatment liquid, the formation of the layer including the treatment liquid is preferably performed before the formation of the layer including the chromatic ink composition and the treatment liquid.

1.5.2. Post-Adhesion Step

The printing recording method according to this embodiment includes, after the simultaneous adhesion step, a post-adhesion step of adhering the achromatic ink composition described above to the same scanning region of the cloth by a main scanning different from the main scanning in the simultaneous adhesion step. After the layer including the treatment liquid and the chromatic ink composition is formed in advance, by the post-adhesion step, since a layer including the achromatic ink composition (coating liquid) can be formed so as to be laminated thereon, the treatment liquid and the coating liquid are likely to be mixed together and are also likely to react to each other. Accordingly, the thickening/aggregation is also facilitated in the coating liquid, and a coating liquid layer can be more likely to be formed as the outermost surface layer. In addition, since the resin particle and the cationic compound further react to each other, the layer can be made tougher. Hence, the present inventor considers that the bleed-through can be suppressed thereby, and in addition, the rubbing fastness can also be made preferable. In addition, in the case in which the coating liquid is not adhered by the post-adhesion step but is simultaneously adhered together with the treatment liquid and the chromatic ink composition, a moisture amount on the cloth is excessively increased, and as a result, bleeding and/or bleed-through is liable to occur. In addition, the reaction between the coating liquid and the treatment liquid is liable to insufficiently proceed, and the rubbing fastness is also liable to be degraded.

In the post-adhesion step, the same main scanning to adhere the achromatic ink composition may be performed a plurality of times on the same scanning region of the cloth. The number of scannings in the post-adhesion step is 1 or more, preferably 2 or more, more preferably 3 or more, and further preferably 4 or more. In addition, although an upper limit of the number of scannings in the post-adhesion step is not particularly limited, for example, the upper limit described above is preferably 12 or less and more preferably 8 or less. By the printing recording method according to this embodiment, even when the number of scannings in the post-adhesion step is in the range described above, a preferable rubbing fastness can be obtained, and in addition, a preferable bleeding (bleed-through) suppression also tends to be obtained.

1.5.3. Step Interval 1.5.3.1. Chromatic Ink Adhesion Step and Achromatic Ink Adhesion Step In the printing recording method according to this embodiment, a time lag between the chromatic ink adhesion step and the achromatic ink adhesion step is preferably 10 seconds or less. The time lag between the chromatic ink adhesion step and the achromatic ink adhesion step is more preferably 9 seconds or less, even more preferably 8 seconds or less, further preferably 7 seconds or less, particularly preferably 6 seconds or less, and more particularly preferably 5 seconds or less. When the above time lag is in the range described above, the cationic compound contained in the treatment liquid preferably tends to react not only to the chromatic ink composition but also to the achromatic ink composition (coating liquid). That is, before the cationic compound contained in the treatment liquid is consumed out by the chromatic ink composition, the coating liquid can be adhered. Accordingly, the thickening/aggregation of the coating liquid is further facilitated, and the coating liquid layer is more likely to be formed as the outermost surface layer. In addition, since the resin particle and the cationic compound further react to each other, the layer can be further made tougher. Hence, the bleed-through can be further suppressed thereby, and in addition, the rubbing fastness can also be made more preferable.

In the present disclosure, the "time lag between the chromatic ink adhesion step and the achromatic ink adhesion step" indicates a time lag from the last ejection of the chromatic ink composition to the first ejection of the achromatic ink composition. In particular, the time lag described above indicates a time lag from the last ejection of the chromatic ink composition to the first ejection of the achromatic ink composition to the same scanning region of the cloth.

In addition, although a lower limit of the time lag between the chromatic ink adhesion step and the achromatic ink adhesion step is not particularly limited, the lower limit described above is preferably 1.0 second or more, more preferably 3.0 seconds or more, and further preferably 4.5 seconds or more. When the time lag described above is in the range described above, since the reaction between the treatment liquid and the coating liquid tends to sufficiently proceed, a preferable rubbing fastness can be obtained, and in addition, a preferable bleeding (bleed-through) suppression tends to be obtained.

1.5.3.2. Chromatic Ink Adhesion Step and Treatment Liquid Adhesion Step

In the printing recording method according to this embodiment, a time lag between the chromatic ink adhesion step and the treatment liquid adhesion step is preferably 5 seconds or less. When the chromatic ink adhesion step and the treatment liquid adhesion step are performed with the time lag as described above, a wet-on-wet method may be performed such that before a first liquid droplet to be adhered in advance is dried, a second liquid droplet to be adhered later is adhered. In addition, when the first liquid droplet is the chromatic ink composition, the second liquid droplet is the treatment liquid, and when the first liquid droplet is the treatment liquid, the second liquid droplet is the chromatic ink composition. In the wet-on-wet method, although advantages such as reduction in size of apparatus and high speed operation are obtained, the bleeding is liable to occur, and the color development property and the rubbing fastness are liable to be unfavorably degraded. However, according to the printing recording method according to this embodiment, even when the wet-on-wet method as described above is used, the color development property and the rubbing fastness can be made excellent, and the bleeding can also be suppressed. In addition, in the printing recording method according to this embodiment, when the time lag described above is 5 seconds or less, the reaction between the chromatic ink composition and the treatment liquid is more likely to proceed, and the color development property and the rubbing fastness tend to be made more excellent.

In the present disclosure, the "time lag between the chromatic ink adhesion step and the treatment liquid adhesion step" indicates a time lag from the last ejection of the treatment liquid to the first ejection of the chromatic ink composition. In particular, the time lag described above indicates a time lag from the last ejection of the treatment liquid to the first ejection of the chromatic ink composition to the same scanning region of the cloth.

The time lag between the chromatic ink adhesion step and the treatment liquid adhesion step in the simultaneous adhesion step is preferably 1 second or less, more preferably 0.7 seconds or less, and further preferably 0.4 seconds or less. In addition, the time lag between the chromatic ink adhesion step and the treatment liquid adhesion step is preferably 0.1 seconds or less and more preferably 0.05 seconds or less. A lower limit of the time lag is not particularly limited, and for example, the lower limit described above is preferably 0.01 seconds or more and preferably 0.1 seconds or more. The time lag between the chromatic ink adhesion step and the treatment liquid adhesion step is particularly preferably 0.3 seconds. When the time lag is as described above, the reaction between the chromatic ink composition and the treatment liquid is more likely to proceed, and the color development property, the rubbing fastness, and the bleed-through suppression tend to be made more excellent.

1.5.4. Step Performing Position

In the printing recording method according to this embodiment, the chromatic ink adhesion step, the treatment liquid adhesion step, and the achromatic ink adhesion step described above are preferably performed on the same support. Since the steps described above are performed on the same support, the printing recording method according to this embodiment can be more simplified. However, the ink composition and the treatment liquid each bled through the cloth cause an aggregation reaction therebetween on the support, and the support may be disadvantageously contaminated in some cases. In particular, in a method in which the ink, the treatment liquid, and the coating liquid are recorded by a wet-on-wet method, the bleed-through is liable to occur, and hence, the support is seriously contaminated thereby. On the other hand, by the printing recording method according to this embodiment, since the bleed-through can be preferably suppressed, the contamination on the support can also be preferably suppressed.

As the support, any material capable of supporting and transporting the cloth and performing the steps may be used without any particular restriction, and a belt provided with an adhesive layer is preferably used as the support. When the belt provided with an adhesive layer is used, since the cloth can be fixed and stably transported, transportation accuracy of the cloth can be enhanced. However, the adhesive layer is liable to trap aggregates formed from the ink composition and the treatment liquid, and in addition, since the treatment liquid bled through the cloth and the adhesive layer are liable to react to each other, washing is difficult to perform. On the other hand, by the printing recording method according to this embodiment, since the bleed-through can be preferably suppressed, the washing is easily carried out, and hence, the belt provided with an adhesive layer can be even preferably used.

As the adhesive layer, for example, there may be used a glue agent containing a poly(vinyl alcohol) (PVA) or the like or a hot melt-based adhesive containing a thermoplastic elastomer SIS (styrene-isoprene-styrene) as a primary component. A commercially available product may also be used as the adhesive layer, and for example, there may be mentioned "POLIXRESIN", "NEWDINE", OR "AQUADINE" Series manufactured by Yokohama Polymer Laboratory Co., Ltd., "MC Polymer Series" manufactured by Murayama Chemical Laboratory Co., Ltd., "Unikensol RV-30 (for screen printing application)" manufactured by Union Chemical Co., Ltd., or "Plaster EH" manufactured by Shin-Nakamura Chemical Co., Ltd., or "ATRASOL GP1 (ATR code: ATR1717)" manufactured by ATR CHEMICALS.

As the belt used as the support, for example, in view of washing easiness or the like, an endless belt in which two end sections of a strip-shaped belt are coupled to form an endless shape is preferably used.

1.6. Ink Jet Printing Apparatus

An example of an ink jet printing apparatus which includes an ink jet head and which is applicable to the printing recording method according to this embodiment will be described with reference to FIG. 1.

In addition, the scales of layers and members shown in FIG. 1 are made different from the actual scales thereof so as to be visually recognized in the drawing. In addition, for the convenience of illustration in FIG. 1, as three axes orthogonal to each other, an X axis, a Y axis, and a Z axis are shown, a front side of each arrow indicating an axial direction shown in the drawing is represented by "+ side", and a base side thereof is represented by "− side". A direction parallel to the X axis, a direction parallel to the Y axis, and a direction parallel to the Z axis are represented by "X axis direction", "Y axis direction", and "Z axis direction", respectively.

1.6.1. Entire Schematic Structure

FIG. 1 is a schematic view showing the entire schematic structure of a recording apparatus 100. The entire structure of the recording apparatus 100 will be described with reference to FIG. 1.

As shown in FIG. 1, the recording apparatus 100 includes a medium transport portion 20, a medium adhesion portion 60, a belt support portion 91, a print portion 40, a heating unit 27, a washing unit 50, and the like. In the recording apparatus 100, the medium adhesion portion 60 and/or the belt support portion 91 corresponds to a heating portion to heat an endless belt 23. In addition, the recording apparatus 100 also includes a control portion 1 to control the portions described above. The portions of the recording apparatus 100 are fitted to a frame portion 90.

In addition, when the heating portion to heat the endless belt is provided, the heating portion may be provided upstream than the print portion 40 in a transport direction and may also be provided at a place different from those of the medium adhesion portion 60 and the belt support portion 91. For example, the heating portion may be located upstream than the medium adhesion portion 60 in the transport direction. Since the structure as described above is formed, the endless belt 23 wetted in the washing can also be dried. In addition, the heating portion may be a portion to heat the endless belt in a contactless manner.

The medium transport portion 20 transports a cloth 95 in the transport direction. The medium transport portion 20 includes a medium supply section 10, transport rollers 21 and 22, the endless belt 23, a belt rotation roller 24, a belt drive roller 25 functioning as a drive roller, transport rollers 26 and 28, and a medium recovery section 30.

1.6.2. Medium Transport Portion

First, a transport path of the cloth 95 from the medium supply section 10 to the medium recovery section 30 will be described. In addition, in FIG. 1, a direction along a direction in which the gravity works is represented by the Z axis direction, a direction in which the cloth 95 is transported in the print portion 40 is represented by the +X axis direction, and a width direction of the cloth 95 intersecting both the Z axis direction and the X axis direction is represented by the Y axis direction. In addition, the positional relationship along the transport direction of the cloth 95 or the transfer direction of the endless belt 23 is also represented by "upstream" or "downstream".

The medium supply section 10 is a section to supply the cloth 95 on which an image is to be formed to a print portion 40 side. The medium supply section 10 includes a supply shaft pole 11 and a bearing base 12. The supply shaft pole 11 is formed to have a cylindrical shape or a columnar shape and is provided rotatably in a circumferential direction. Around the supply shaft pole 11, the strip-shaped cloth 95 is wound in the form of a roll. The supply shaft pole 11 is detachably fitted to the bearing base 12. Accordingly, the cloth 95 wound in advance around the supply shaft pole 11 is configured to be fitted to the bearing base 12 together with the supply shaft pole 11.

The bearing base 12 rotatably supports the two ends of the supply shaft pole 11 in the axis direction thereof. The medium supply section 10 includes a rotation driver (not shown) to rotatably drive the supply shaft pole 11. The rotation driver rotates the supply shaft pole 11 in a direction in which the cloth 95 is fed out. An operation of the rotation driver is controlled by the control portion 1. The transport rollers 21 and 22 convey the cloth 95 from the medium supply section 10 to the endless belt 23.

The endless belt 23 is supported between at least two rollers to rotate the endless belt 23, and since the endless belt 23 is rotationally transferred, the cloth 95 is transported in the transport direction (+X axis direction) while being supported. In particular, the endless belt 23 is a seamless belt formed such that two ends of a strip-shaped belt are seamlessly coupled to each other and is provided between the belt rotation roller 24 and the belt drive roller 25.

The endless belt 23 is supported while a predetermined tension is applied thereto so that an area of the belt between the belt rotation roller 24 and the belt drive roller 25 is held flat along the horizontal direction. On a surface (support surface) 23a of the endless belt 23, an adhesive 29 to adhere the cloth 95 is applied. That is, the endless belt 23 is provided with an adhesive layer formed from the adhesive 29. The cloth 95 is adhered to the endless belt 23 with the adhesive 29 interposed therebetween. The endless belt 23 supports (holds) the cloth 95 which is supplied from the transport roller 22 and which is in close contact with the adhesive 29 by the medium adhesion portion 60.

The adhesive 29 preferably increases its adhesiveness by heating. Since the adhesive 29 which increases its adhesiveness by heating is used, the cloth 95 can be preferably in close contact with the adhesive layer. As the adhesive 29 as described above, for example, the hot melt-based adhesive described above which contains a thermoplastic elastomer SIS (styrene-isoprene-styrene) as a primary component may be mentioned.

The belt rotation roller 24 and the belt drive roller 25 support an inner circumferential surface 23b of the endless belt 23. Between the belt rotation roller 24 and the belt drive roller 25, a contact section 69 to support the endless belt 23, the belt support portion 91, and a platen 46 are provided. The contact section 69 is provided in a region facing a press section 61 which will be described later with the endless belt 23 interposed therebetween, the platen 46 is provided in a region facing the print portion 40 with the endless belt 23 interposed therebetween, and the belt support portion 91 is provided between the contact section 69 and the platen 46. Since the contact section 69, the belt support portion 91, and the platen 46 support the endless belt 23, the endless belt 23 is suppressed from being vibrated in conjunction with the transfer of the endless belt 23.

The belt drive roller 25 is a drive section to transport the cloth 95 in the transport direction by rotating the endless belt 23 and has a motor (not shown) to rotationally drive the belt drive roller 25. The belt drive roller 25 is provided downstream than the print portion 40 in the transport direction of the cloth 95, and the belt rotation roller 24 is provided upstream than the print portion 40. When the belt drive roller 25 is rotationally driven, the endless belt 23 is rotated in conjunction with the rotation of the belt drive roller 25, and by the rotation of the endless belt 23, the belt rotation roller 24 is rotated. By the rotation of the endless belt 23, the cloth 95 supported by the endless belt 23 is transported in the transport direction (+X axis direction), and in the print portion 40 which will be described later, an image is formed on the cloth 95.

In the example shown in FIG. 1, the cloth 95 is supported at a side (+Z axis side) at which the surface 23a of the endless belt 23 faces the print portion 40 and is transported together with the endless belt 23 from a belt rotation roller 24 side to a belt drive roller 25 side. In addition, at a side (−Z axis side) at which the surface 23a of the endless belt 23 faces the washing unit 50, the endless belt 23 is only transferred from the belt drive roller 25 side to the belt rotation roller 24 side.

The transport roller 26 peels away the cloth 95 on which an image is formed from the adhesive layer 29 provided on the endless belt 23. The transport rollers 26 and 28 convey the cloth 95 from the endless belt 23 to the medium recovery section 30.

The medium recovery section 30 recovers the cloth 95 supplied from the medium supply section 10. The medium recovery section 30 includes a winding axis pole 31 and a bearing base 32. The winding axis pole 31 is formed to have a cylindrical or a columnar shape and is provided rotatably in a circumferential direction. Around the winding axis pole 31, the strip-shaped cloth 95 is wound in the form of a roll. The winding axis pole 31 is detachably fitted to the bearing base 32. Accordingly, the cloth 95 wound around the winding axis pole 31 is configured to be removed together with the winding axis pole 31.

The bearing base 32 rotatably supports the two ends of the winding axis pole 31 in the axis direction thereof. The medium recovery section 30 includes a rotation driver (not shown) to rotatably drive the winding axis pole 31. The rotation drive section rotates the winding axis pole 31 in a direction in which the cloth 95 is wound. An operation of the rotation driver is controlled by the control portion 1.

Next, the heating portion, the print portion 40, and the heating unit 27, and the washing unit 50 provided along the medium transport portion 20 will be described.

1.6.3. Heating Portion

A heater to heat the endless belt 23 is preferably provided at the contact section 69 and/or the belt support portion 91. The heater forms the heating portion. When the heater is provided at the contact section 69, since a pressing force and heat can be applied to the endless belt 23 by the press section 61, the contact of the cloth 95 to the endless belt 23 can be preferably improved. Hence, when being provided at the contact section 69 or the belt support portion 91, the heater is more preferably provided at the contact section 69.

The heating portion softens the adhesive layer by heating to enhance the adhesiveness thereof and improves the adhesion between the cloth 95 and the adhesive layer. Accordingly, the cloth 95 is suppressed from being moved on the endless belt 23, and hence, preferable transport accuracy can be obtained.

When the heater is provided at the contact section 69 and/or the belt support portion 91, and when the endless belt 23 is heated, a temperature of the surface 23a of the endless belt 23 is preferably 80° C. or less, more preferably 70° C. or less, and further preferably 60° C. or less. When the temperature of the surface 23a of the endless belt 23 is in the range described above, the reactivity of the resin particle contained in the ink composition is suppressed, and hence, the washing of the belt may be more easily performed in some cases. A lower limit of the temperature of the surface 23a of the endless belt 23 is not particularly limited as long as the adhesiveness of the adhesive layer is obtained, and the lower limit described above is preferably 30° C. or more, more preferably 35° C. or more, and further preferably 40° C. or more. In addition, the temperature of the surface 23a of the endless belt 23 can be measured, for example, by a radiation type thermometer, a contact type thermometer, or the like, and the temperature described above is more preferably measured by a radiation type thermometer.

When the heater is provided at the contact section 69 and/or the belt support portion 91, a temperature detection section (not shown) to detect the surface temperature of the endless belt 23 may be provided. As the temperature detection section, for example, a thermocouple may be used. Accordingly, since the heater is controlled by the control portion 1 based on the temperature detected by the temperature detection section, the endless belt 23 is able to have a predetermined temperature. In addition, the temperature detection section may use a contactless thermometer using infrared rays.

1.6.4. Print Portion

The print portion 40 is disposed at an upper side (+Z axis side) with respect to the arrangement position of the endless belt 23 and performs printing on the cloth 95 placed on the surface 23a of the endless belt 23. The print portion 40 includes an ink jet head 42, a carriage 43 on which the ink jet head 42 is mounted, and a carriage transfer section 45 to transfer the carriage 43 in a width direction (Y axis direction) of the cloth 95 intersecting the transport direction.

The ink jet head 42 is a device to spray from a plurality of nozzles, the ink composition or the treatment liquid supplied from a liquid cartridge (not shown) by the control of the control portion 1 to the cloth 95 so as to be adhered thereto. The ink jet head 42 includes the nozzles in a surface facing the cloth 95 to which the ink composition or the treatment liquid is to be adhered to eject the ink composition or the treatment liquid so as to be adhered to the cloth 95. Those nozzles are disposed in lines to form nozzle lines, and the nozzle lines are respectively arranged corresponding to the ink composition and the treatment liquid. The ink composition and the treatment liquid are supplied from the respective liquid cartridges to the ink jet head 42 and are ejected in the form of liquid droplets from the nozzles by actuators (not shown) provided in the ink jet head 42. The liquid droplets of the ink composition and the treatment liquid thus ejected are landed on the cloth 95 and are adhered thereto, so that an image, a text, a pattern, a color, and/or the like is formed by the ink in a printing region of the cloth 95.

In addition, in the ink jet head 42, although a piezoelectric element is used as the actuator which is a drive device, the drive device is not limited thereto. For example, an electromechanical conversion element to displace a vibration plate functioning as an actuator by electrostatic adsorption or an electrothermal conversion element to eject an ink composition in the form of liquid droplets by air bubbles generated by heating may be used.

As the ink jet head 42, for example, various types of ink jet heads, such as an ink jet head 42a having a head nozzle group to eject the treatment liquid, an ink jet head 42b having a head nozzle group to eject the chromatic ink composition, and an ink jet head 42c having a head nozzle group to eject the achromatic ink composition, are provided on the carriage 43. In addition, the head nozzle group to perform the ejection indicates a nozzle group to be used for recording in the recording method. When the main scanning (in the Y axis direction) is performed, if an image to be recorded is present in a region of the cloth facing the nozzle group described above, this nozzle group is a group of nozzles capable of ejecting the ink or the like and is a nozzle group continuously extended in the transport direction (+X axis direction). Hence, a nozzle group which itself is present but is not used for recording in the recording method is not included in the nozzle group to perform the ejection.

In the printing recording method according to this embodiment, the head nozzle group to eject the treatment liquid is preferably located at the same position as that of the head nozzle group to eject the chromatic ink composition in the transport direction of the cloth or preferably has a portion overlapped with the head nozzle group to eject the chromatic ink composition in the transport direction of the cloth, and the head nozzle group to eject the achromatic ink composition is preferably located downstream than the head nozzle group to eject the chromatic ink composition in the transport direction of the cloth.

In addition, from the same point as described above, the ink jet head to eject the treatment liquid is preferably located at the same position as that of the ink jet head to eject the chromatic ink composition in the transport direction of the cloth or preferably has a portion overlapped with the ink jet head to eject the chromatic ink composition in the transport direction of the cloth, and the ink jet head to eject the achromatic ink composition is preferably located downstream than the ink jet head to eject the chromatic ink composition in the transport direction of the cloth.

In addition, from the same point as described above, the head nozzle group to eject the treatment liquid to be used for recording preferably has a portion overlapped with the head nozzle group to eject the chromatic ink composition to be used for recording, and the head nozzle group to eject the achromatic ink composition to be used for recording is preferably located downstream than the head nozzle group to eject the chromatic ink composition to be used for recording in the transport direction of the cloth.

When the structure is formed as described above, the simultaneous adhesion step and the post-adhesion step described above can be preferably performed, and hence, the color development property, the rubbing fastness, and the bleed-through suppression tend to be made more excellent.

Figure 2:
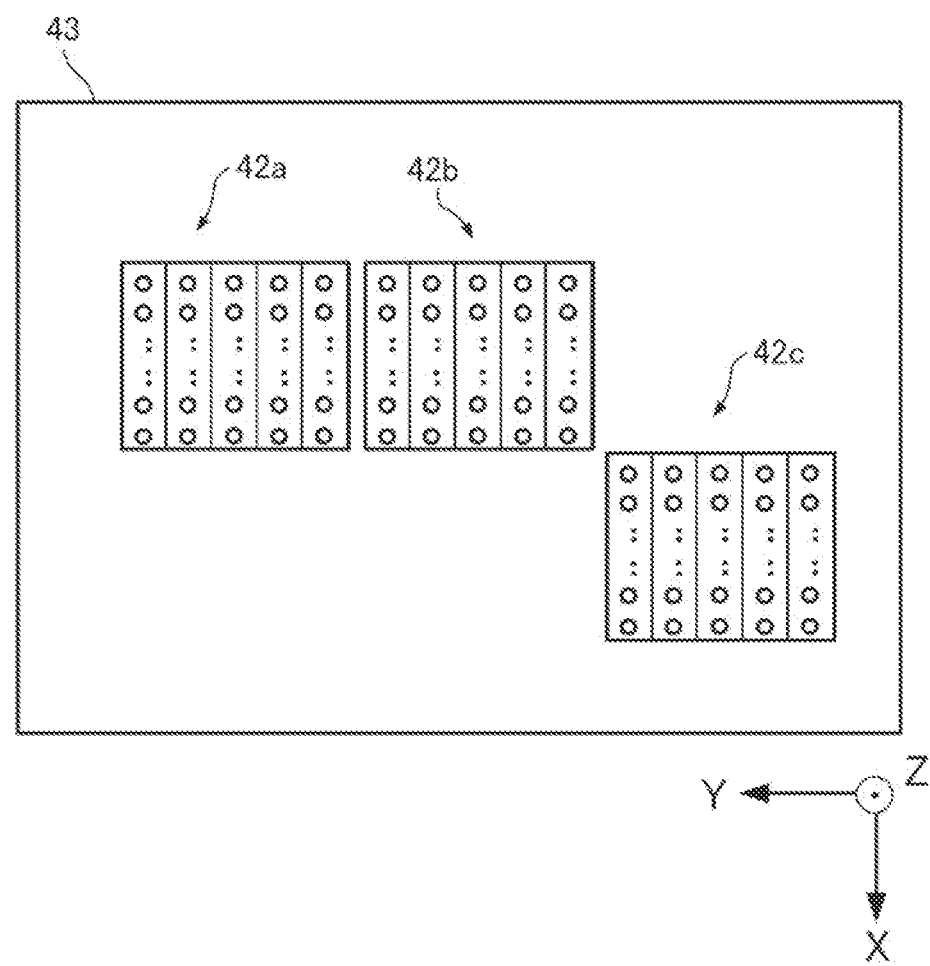
FIG. 2 is a schematic view showing one example of arrangement of ink jet heads of an ink jet printing apparatus.

For example, according to an example of the head arrangement shown in FIG. 2, the head nozzle group to eject the treatment liquid of the ink jet head 42a is arranged adjacent to the head nozzle group to eject the chromatic ink composition of the ink jet head 42b and at the same position as that thereof in the transport direction (+X axis direction) of the cloth 95, and the head nozzle group to eject the achromatic ink composition of the ink jet head 42c is arranged downstream than the head nozzle group to eject the chromatic ink composition of the ink jet head 42b in the transport direction (+X axis direction) of the cloth 95. When the head arrangement structure is as described above, the simultaneous adhesion step and the post-adhesion step described above can be preferably performed, and hence, the color development property, the rubbing fastness, and the bleed-through suppression tend to be made more excellent. In addition, the nozzle groups shown in FIG. 2 are the head nozzle groups to perform the ejection of the respective ink jet heads. In addition, the ink jet head 42a and the ink jet head 42b may be reversely arranged.

For example, according to an example of the head arrangement shown in FIG. 3, the head nozzle group to eject the treatment liquid of the ink jet head 42a is not located at the same position as that of the head nozzle group to eject the chromatic ink composition of the ink jet head 42b in the transport direction (+X axis direction) of the cloth 95 but has a portion overlapped therewith, and the head nozzle group to eject the achromatic ink composition of the ink jet head 42c is arranged downstream than the head nozzle group to eject the chromatic ink composition of the ink jet head 42b in the transport direction (+X axis direction) of the cloth 95. When the head arrangement structure is as described above, the simultaneous adhesion step and the post-adhesion step described above can be preferably performed, and hence, the color development property, the rubbing fastness, and the bleed-through suppression tend to be made more excellent. In addition, the nozzle groups shown in FIG. 3 are the head nozzle groups to perform the ejection of the respective ink jet heads. In addition, the ink jet head 42a and the ink jet head 42b may be reversely arranged.

In addition, the "portion overlapped" indicates a portion of the head nozzle group to eject the chromatic ink composition to be used for recording and a portion of the head nozzle group to eject the treatment liquid to be used for recording which are located at the same position in the transport direction (+X axis direction) of the cloth 95. Accordingly, by the same main scanning, the layer including the treatment liquid and the chromatic ink composition can be formed.

The carriage transfer section 45 is provided at an upper side (+Z axis direction) of the endless belt 23. The carriage transfer section 45 includes a pair of guide rails 45a and 45b extending along the Y axis direction. The ink jet head 42 is supported by the guide rails 45a and 45b in a reciprocally transferable manner along the Y axis direction with the carriage 43.

The carriage transfer section 45 includes a transfer mechanism and a power source not shown. As the transfer mechanism, for example, a mechanism using a ball screw and a ball nut in combination or a linear guide mechanism may be used. Furthermore, the carriage transfer section 45 includes a motor (not shown) as the power source to transfer the carriage 43 along the guide rails 45a and 45b. As the motor, various types of motors, such as a stepping motor, a servo motor, and a linear motor, may be used. When the motor is driven by the control of the control portion 1, the ink jet head 42 is transferred along the Y axis direction with the carriage 43.

1.6.5. Heating Unit

The heating unit 27 may be provided between the transport rollers 26 and 28. The heating unit 27 heats the ink composition and the treatment liquid ejected on the cloth 95. Accordingly, the reaction of the resin particle contained in the ink composition tends to sufficiently proceed. Since the resin particle sufficiently reacts, an image having a preferable rubbing fastness may be formed in some cases. In addition, the heating unit 27 may also be used in order to dry the cloth 95. In the heating unit 27, for example, an IR heater is contained, and by driving the IR heater, the ink composition and the treatment liquid ejected on the cloth 95 can be made to react to each other in a short period. As a result, the strip-shaped cloth 95 on which an image or the like is formed can be wound around the winding axis pole 31.

1.6.6. Washing Unit

The washing unit 50 is disposed between the belt rotation roller 24 and the belt drive roller 25 in the X axis direction. The washing unit 50 includes a washing section 51, a press section 52, and a transfer section 53. The transfer section 53 integrally transfers the washing unit 50 along a floor surface 99 and then fixes the washing unit 50 at a predetermined position.

The press section 52 is an elevating device formed, for example, of an air cylinder 56 and a ball bush 57 and enables the washing section 51 provided at an upper side to come into contact with the surface 23a of the endless belt 23. The washing section 51 washes from a bottom side (−Z axis direction), the surface (support surface) 23a of the endless belt 23 which is stretched between the belt rotation roller 24 and the belt drive roller 25 with a predetermined tension and which is transferred from the belt drive roller 25 to the belt rotation roller 24.

The washing section 51 includes a washing bath 54, a washing roller 58, and a blade 55. The washing bath 54 is a bath to store a washing liquid used for washing of the ink and foreign materials adhered to the surface 23a of the endless belt 23, and the washing roller 58 and the blade 55 are provided in the washing bath 54. As the washing liquid, for example, water and/or a water-soluble solvent (alcohol aqueous solution or the like) may be used, and if needed, a surfactant and/or a defoaming agent may also be added thereto.

When the washing roller 58 is rotated, the washing liquid is supplied to the surface 23a of the endless belt 23, and at the same time, the washing roller 58 and the endless belt 23 are rubbed with each other. Accordingly, the ink composition, fibers of the cloth 95, and the like adhered to the endless belt 23 are removed by the washing roller 58.

The blade 55 may be formed, for example, from a flexible material, such as a silicone rubber. The blade 55 is provided downstream than the washing roller 58 in the transport direction of the endless belt 23. Since the endless belt 23 and the blade 55 are rubbed with each other, the washing liquid remaining on the surface 23a of the endless belt 23 is removed.

2. Examples

Hereinafter, although the present disclosure will be described in more detail with reference to Examples, the present disclosure is not limited thereto. Hereinafter, unless otherwise particularly described, "%" is represented on a mass basis.

2.1. Preparation of Treatment Liquid

After components were charged in a container to have one of the compositions shown in the following Table 1, mixing and stirring were performed for one hour by a magnetic stirrer, and filtration was then performed using a PTFE-made membrane filter having a size of 8 μm, so that each treatment liquid was obtained. Pure water was added so that the total mass of each treatment liquid was 100 percent by mass. In addition, the numerical value of the cationic polymer in the following Table 1 represents percent by mass of an effective component on a solid content basis.

TABLE 1

| | | | TREATMENT LIQUID 1 | TREATMENT LIQUID 2 | TREATMENT LIQUID 3 |
|---|---|---|---|---|---|
| TREATMENT LIQUID COMPOSITION CONCENTRATION (PERCENT BY MASS) | CATIONIC COMPOUND | CATIONIC POLYMER | Kymene 557 | 6.0 | | 6.0 |
| | | POLYVALENT METAL SALT | MAGNESIUM SULFATE | | 2.5 | 2.5 |
| | ORGANIC SOLVENT | | GLYCERIN | 20 | 20 | 20 |
| | SURFACTANT | | OLFINE E1010 | 0.5 | 0.5 | 0.5 |
| | ANTISEPTIC/ ANTIBACTERIAL AGENT | | PROXEL XL2 | 0.2 | 0.2 | 0.2 |
| | WATER | | PURE WATER | BALANCE | BALANCE | BALANCE |

The description of Table 1 will be further explained.

Kymene 557 (trade name, manufactured by SOLENIS, polyamide-epichlorohydrin resin)

Olfine E1010 (trade name, manufactured by Nisshin Chemical Industry Co., Ltd., acetylene glycol-based surfactant)

Proxel XL2 (trade name, manufactured by Lonza Japan, 1,2-dibenzisothiazolin-3-one)

2.2. Preparation of Chromatic Ink Composition

After components were charged in a container to have one of the compositions shown in the following Table 2, mixing and stirring were performed for one hour by a magnetic stirrer, and filtration was then performed using a PTFE-made membrane filter having a size of 8 μm, so that each chromatic ink composition was obtained. Pure water was added so that the total mass of each chromatic ink composition was 100 percent by mass. In addition, the numerical value of the first resin particle in the following Table 2 represents percent by mass of an effective component on a solid content basis.

In addition, as the pigment, a pigment dispersion was prepared in advance such that a pigment and a pigment dispersant which was a water-soluble styrene-acrylic-based resin (not shown in the table) at a mass ratio of 2:1 were mixed and stirred with water, and this pigment dispersion was used for the preparation of the ink.

TABLE 2

| | | | INK 1 | INK 2 |
|---|---|---|---|---|
| INK COMPOSITION CONCENTRATION (PERCENT BY MASS) | ANIONIC FIRST RESIN PARTICLE | UW-1527F | 4.0 | |
| | | MOVINYL 6760 | | 4.0 |
| | PIGMENT | PB15:3 | 3.5 | 3.5 |
| | OTHER SOLVENTS | GLYCERIN | 12.8 | 12.8 |
| | | TEG | 4.5 | 4.5 |
| | | BTG | 0.7 | 0.7 |
| | | OLFINE E1010 | 0.5 | 0.5 |
| | | TEA | 1 | 1 |
| | | PURE WATER | BALANCE | BALANCE |

The descriptions of Tables 2 and 3 will be further explained.

UW-1527F (ETANACOL UW Series UW-1527, trade name, manufactured by Ube Industries, Ltd., urethane-based resin)

Movinyl 6760 (trade name, Nippon Synthetic Chemical Industry Co., Ltd., acrylic-based resin)

PB15: 3 (cyan pigment, C.I. Pigment Blue 15:3)

TEG (triethylene glycol)

BTG (triethylene glycol monobutyl ether)

Olfine E1010 (trade name, manufactured by Nisshin Chemical Industry Co., Ltd., acetylene glycol-based surfactant)

TEA (triethanolamine)

2.3. Preparation of Achromatic Ink Composition

After components were charged in a container to have one of the compositions shown in the following Table 3, mixing and stirring were performed for one hour by a magnetic stirrer, and filtration was then performed using a PTFE-made membrane filter having a size of 8 μm, so that each achromatic ink composition was obtained. Pure water was added so that the total mass of each achromatic ink composition was 100 percent by mass. In addition, the numerical value of the second resin particle in the following Table 3 represents percent by mass of an effective component on a solid content basis.

TABLE 3

|  |  |  | COATING LIQUID 1 | COATING LIQUID 2 |
|---|---|---|---|---|
| COATING LIQUID COMPOSITION CONCENTRATION (PERCENT BY MASS) | ANIONIC SECOND RESIN PARTICLE | UW-1527F MOVINYL 6760 | 10.0 | 10.0 |
|  | OTHER SOLVENTS | GLYCERIN | 20 | 20 |
|  |  | TEG | 4.5 | 4.5 |
|  |  | BTG | 0.7 | 0.7 |
|  |  | OLFINE E1010 | 0.5 | 0.5 |
|  |  | TEA | 1 | 1 |
|  |  | PURE WATER | BALANCE | BALANCE |

2.4. Printing Recording Method

By using a modified machine of PX-H8000 (manufactured by Seiko Epson Corporation), printing was performed on a recording medium of a 100%-cotton white broad under the printing conditions shown in the following Table 4 such that a main scanning was performed a plurality of times (2, 4, 8, 12, or 16 times) on the same scanning region, so that a solid pattern image was formed on an A4-size cloth which was the recording medium. Subsequently, drying was performed at 160° C. for 3 minutes by a heat treatment using an oven, so that a printed matter of each of Examples and Comparative Examples was formed. In addition, the "solid pattern image" indicates an image in which dots are recorded on all pixels each indicating a minimum recording unit area defined by the recording resolution (duty of 100%).

In addition, an ink jet head used a head unit in which a distance between nozzles in a recording medium width direction was 600 dpi, and the number of nozzles was 600. In addition, in each Example, the head arrangement shown in FIG. 2 was used in which the head nozzle group to eject the treatment liquid and the head nozzle group to eject the chromatic ink composition had portions located at the same position in the sub-scanning direction, and in which the head nozzle group to eject the achromatic ink composition was disposed downstream than the head nozzle group to eject the chromatic ink composition in the sub-scanning direction. Accordingly, by the same main scanning, the treatment liquid and the chromatic ink composition were adhered to the same scanning region of the cloth, and by a main scanning different from the above same main scanning, the achromatic ink composition was adhered to the same scanning region of the cloth.

On the other hand, in Comparative Example 1, a head arrangement was used in which the head nozzle group to eject the treatment liquid, the head nozzle group to eject the chromatic ink composition, and the head nozzle group to eject the achromatic ink composition had portions located at the same position in the sub-scanning direction. Accordingly, the treatment liquid, the chromatic ink composition, and the achromatic ink composition were all configured to be adhered to the same scanning region of the cloth by the same main scanning.

In Comparative Example 2, a head arrangement was used in which the head nozzle group to eject the chromatic ink composition was disposed downstream than the head nozzle group to eject the treatment liquid in the sub-scanning direction, and in which the head nozzle group to eject the achromatic ink composition is disposed downstream than the head nozzle group to eject the chromatic ink composition in the sub-scanning direction. Accordingly, the treatment liquid, the chromatic ink composition, and the achromatic ink composition were all configured to be adhered to the same scanning region of the cloth by main scannings different from each other.

In Comparative Example 3, although a head arrangement similar to that of Comparative Example 1 was used, the achromatic ink composition was not used.

In Comparative Example 4, although a head arrangement similar to that of Comparative Example 2 was used, the achromatic ink composition was not used.

TABLE 4

|  |  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| COMPOSITION | TREATMENT LIQUID | TREATMENT LIQUID 1 | TREATMENT LIQUID 2 | TREATMENT LIQUID 3 | TREATMENT LIQUID 3 | TREATMENT LIQUID 3 | TREATMENT LIQUID 3 | TREATMENT LIQUID 3 |
|  | INK | INK 1 | INK 1 | INK 1 | INK 1 | INK 1 | INK 1 | INK 1 |
|  | COATING LIQUID | COATING LIQUID 1 | COATING LIQUID 1 | COATING LIQUID 1 | COATING LIQUID 1 | COATING LIQUID 1 | COATING LIQUID 1 | COATING LIQUID 1 |

TABLE 4-continued

|  |  |  |  |  |  |  |  |  |
|---|---|---|---|---|---|---|---|---|
| EJECTION ORDER | TREATMENT LIQUID | SIMUL-TANEOUS STEP | SIMUL-TANEOUS STEP | SIMUL-TANEOUS STEP | SIMUL-TANEOUS STEP | SIMUL-TANEOUS STEP | SIMUL-TANEOUS STEP | SIMUL-TANEOUS STEP |
|  | INK COATING LIQUID | POST STEP | POST STEP | POST STEP | POST STEP | POST STEP | POST STEP | POST STEP |
| NUMBER OF PASSES |  | 4 pass | 4 pass | 4 pass | 4 pass | 4 pass | 4 pass | 1 pass |
| TREATMENT LIQUID-INK TIME LAG (SEC) |  | 0.3 sec | 0.3 sec | 0.3 sec | 0.3 sec | 0.3 sec | 0.03 sec | 0.3 sec |
| INK-COATING LIQUID TIME LAG (SEC) |  | 4.5 sec | 4.5 sec | 4.5 sec | 9 sec | 60 sec | 4.5 sec | 1.1 sec |
| EVAL-UATION | BLEED-THROUGH SUPPRESSION | B | A | A | A | B | A | B |
|  | COLOR DEVELOPMENT PROPERTY | B | A | A | A | A | A | B |
|  | RUBBING FASTNESS | A | B | A+ | A+ | A | A+ | A |

|  |  | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| COMPOSITION | TREATMENT LIQUID | TREATMENT LIQUID 3 | TREATMENT LIQUID 3 | TREATMENT LIQUID 3 | TREATMENT LIQUID 3 | TREATMENT LIQUID 3 | TREATMENT LIQUID 3 | TREATMENT LIQUID 3 |
|  | INK | INK 1 | INK 2 | INK 1 | INK 1 | INK 1 | INK 1 | INK 1 |
|  | COATING LIQUID | COATING LIQUID 1 | COATING LIQUID 1 | COATING LIQUID 2 | COATING LIQUID 1 | COATING LIQUID 1 | NONE | NONE |
| EJECTION ORDER | TREATMENT LIQUID | SIMULTANEOUS STEP | SIMULTANEOUS STEP | SIMULTANEOUS STEP | SIMULTANEOUS STEP | PRECEDING STEP | SIMULTANEOUS STEP | PRECEDING STEP |
|  | INK |  |  |  |  | INTERMEDIATE STEP |  | INTERMEDIATE STEP |
|  | COATING LIQUID | POST STEP | POST STEP | POST STEP |  | POST STEP | NONE | NONE |
| NUMBER OF PASSES |  | 8 pass | 4 pass | 4 pass | 4 pass | 4 pass | 4 pass | 4 pass |
| TREATMENT LIQUID-INK TIME LAG (SEC) |  | 0.03 sec | 0.3 sec | 0.3 sec | 0.3 sec | 4.5 sec | 0.3 sec | 4.5 sec |
| INK-COATING LIQUID TIME LAG (SEC) |  | 9 sec | 4.5 sec | 4.5 sec | 0.3 sec | 4.5 sec | — | — |
| EVAL-UATION | BLEED-THROUGH SUPPRESSION | A | B | B | C | C | A | B |
|  | COLOR DEVELOPMENT PROPERTY | A | B | A | C | C | B | C |
|  | RUBBING FASTNESS | A+ | A | B | B | B | C | C |

The description of the above Table 4 will be further described.

"SIMULTANEOUS STEP" indicates a simultaneous adhesion step to adhere the treatment liquid and the chromatic ink composition to the same scanning region of the cloth by the same main scanning.

"POST STEP" indicates a post-adhesion step of adhering, after the simultaneous adhesion step, the achromatic ink composition on the same scanning region of the cloth by a main scanning different from that in the above simultaneous adhesion step.

"INTERMEDIATE STEP" indicates that the treatment liquid and the chromatic ink composition are adhered to the same scanning region of the cloth by different main scannings.

"NUMBER OF PASSES" indicates the number of passes of the ink jet head passing over the region during the recording. For example, in each Example, the recording is performed repeatedly in accordance with the number of passes shown in the above Table 4 on the same scanning region of the cloth using the treatment liquid and the chromatic ink composition by the same main scanning, and subsequently, the recording is performed repeatedly in accordance with the number of passes shown in the above Table 4 on the same scanning region of the cloth using the achromatic ink composition by a main scanning different from that in the simultaneous adhesion step.

"TREATMENT LIQUID-INK TIME LAG" is a time lag between the treatment liquid adhesion step and the chromatic ink adhesion step and indicates a time lag from the last ejection of the treatment liquid to the same scanning region of the cloth to the first ejection of the chromatic ink composition thereto. In particular, when the simultaneous adhesion step is performed, since the time lag thereof is a time lag from the ejection of the treatment liquid to the ejection of the chromatic ink composition in the same main scanning, the time lag described above is a time lag corresponding to one nozzle line in the shortest.

"INK-COATING LIQUID TIME LAG" is a time lag between the chromatic ink adhesion step and the achromatic ink adhesion step and indicates a time lag from the last ejection of the chromatic ink composition to the same scanning region of the cloth to the first ejection of the achromatic ink composition thereto.

2.5. Evaluation Method 2.5.1. Bleed-Through Suppression

An OD value of cyan on a rear surface of the printed matter obtained as described above was measured using a fluorescent spectrodensitometer ("FD-7", manufactured by Konica Minolta, Inc.), and the degree of bleed-through suppression was evaluated by the following criteria. When the evaluation result was B or higher, it was considered that the bleed-through was suppressed, and the contamination of the transport system was prevented.

Evaluation Criteria

A: OD value of less than 0.46
B: OD value of 0.46 to less than 0.6
C: OD value of 0.6 or more 2.5.2. Color Development Property An OD value of cyan on a printed surface of the printed matter obtained as described above was measured using a fluorescent spectrodensitometer ("FD-7", manufactured by Konica Minolta, Inc.), and the color development property was evaluated by the following criteria. When the evaluation result was B or higher, it was considered that a preferable color development property was obtained.

Evaluation Criteria

A: OD value of 1.46 or more
B: OD value of 1.42 to less than 1.46
C: OD value of less than 1.42

2.5.3. Rubbing Fastness

A rubbing fastness of the printed matter obtained as described above was tested by a test method in accordance with ISO105-X12, and the wet rubbing fastness was evaluated by the following criteria. When the evaluation result was B or higher, it was considered that a preferable wet rubbing fastness was obtained.

Evaluation Criteria

A+: grade 4 or higher
A: grade 3-4
B: grade 3
C: lower than grade 3

2.6. Evaluation Results

Evaluation results are shown in the above Table 4.

In the printing recording method according to each Example which includes the chromatic ink adhesion step of adhering a liquid droplet of the chromatic ink composition which contains the pigment and the anionic first resin particle to the cloth; the treatment liquid adhesion step of adhering a liquid droplet of the treatment liquid which contains the cationic compound to the cloth; and the achromatic ink adhesion step of adhering a liquid droplet of the achromatic ink composition which contains the anionic second resin particle to the cloth and in which the treatment liquid adhesion step, the chromatic ink adhesion step, and the achromatic ink adhesion step are performed by an ink jet method, the ink jet method is a method which performs a main scanning a plurality of times for the recording by transferring the ink jet head in a direction perpendicular to the transport direction of the cloth, and the ink jet method includes: the simultaneous adhesion step of adhering the treatment liquid and the chromatic ink composition to the same scanning region of the cloth by the same main scanning, and after the simultaneous adhesion step, the post-adhesion step of adhering the achromatic ink composition to the same scanning region of the cloth by a main scanning different from that in the simultaneous adhesion step, as shown in the above Table 4, the bleed-through can be preferably suppressed, and a preferable rubbing fastness can be obtained.

By comparison between Example 3 and Comparative Example 1, it is found that when the treatment liquid, the chromatic ink composition, and the achromatic ink composition (coating liquid) are all adhered to the same scanning region of the cloth by the same main scanning, the moisture amount is increased, and the bleed-through suppression and the color development property are both inferior. In addition, since the coating liquid layer is not likely to be formed as the outermost surface layer, the rubbing fastness is also inferior.

By comparison between Example 3 and Comparative Example 2, it is found that when the treatment liquid, the chromatic ink composition, and the achromatic ink composition are all adhered to the same scanning region of the cloth by the main scannings different from each other, the reaction between the treatment liquid and the coating liquid is not likely to occur, and hence, the bleed-through suppression, the color development property, and the rubbing fastness are all inferior.

By comparison between Example 3 and Comparative Example 3, it is found that when the coating liquid is not used, the rubbing fastness is inferior. In addition, since a light-scattering preventing effect of a recording surface by the coating liquid layer cannot be obtained, the color development property is also slightly inferior.

By comparison between Example 3 and Comparative Example 4, it is found that when the coating liquid is not used, the rubbing fastness is inferior. In addition, since the ink and the treatment liquid are not simultaneously adhered, the reactivity therebetween is degraded, and hence, the color development property and the bleed-through suppression are also inferior.

From the results of Examples 1 to 3, it is found that when the cationic polymer and the polyvalent metal salt are both contained in the treatment liquid as the cationic compound, the bleed-through suppression, the color development property, and the rubbing fastness can be made more preferable.

From the results of Examples 3, 4, and 5, it is found that when the time lag between the chromatic ink adhesion step and the achromatic ink adhesion step is within 10 seconds, the bleed-through suppression and the rubbing fastness are made more preferable. The reason for this is considered that before permeating in the cloth, the treatment liquid is mixed with the coating liquid and is likely to react therewith.

From the results of Examples 3 and 6, it is found that even when the time lag between the treatment liquid adhesion step and the chromatic ink adhesion step is shorter, the bleed-through suppression, the color development property, and the rubbing fastness are all made preferable.

From the results of Examples 3, 7, and 8, it is found that as the pass number is increased, the bleed-through suppression and the color development property tend to be made more preferable. The reason for this is considered that since the treatment liquid and the chromatic ink composition are alternately laminated to each other (in the form of mille-feuille), the components of the above two compounds are likely to be mixed together, and hence, the reaction therebetween is likely to proceed.

From the results of Examples 3 and 9, it is found that when the resin particle contained in the chromatic ink composition is an urethane resin, the aggregation/thickening effect is further facilitated in the reaction with the cationic compound in the treatment liquid, and hence, the bleed-through suppression and the color development property are made more preferable.

From the results of Examples 3 and 10, it is found that when the resin particle contained in the achromatic ink composition is an urethane resin, since the aggregation/thickening effect is further facilitated in the reaction with the cationic compound in the treatment liquid, and the coating liquid layer present as the outermost surface layer is further toughened, the bleed-through suppression, the color development property, and the rubbing fastness are made more preferable.

From the embodiments described above, the following conclusions are obtained.

A printing recording method according one aspect of the present disclosure comprises: a chromatic ink adhesion step of adhering a liquid droplet of a chromatic ink composition which contains a pigment and an anionic first resin particle to a cloth; a treatment liquid adhesion step of adhering a liquid droplet of a treatment liquid which contains a cationic compound to the cloth; and an achromatic ink adhesion step of adhering a liquid droplet of an achromatic ink composition which contains an anionic second resin particle to the cloth. In the printing recording method described above, the treatment liquid adhesion step, the chromatic ink adhesion step, and the achromatic ink adhesion step are performed by an ink jet method, the ink jet method is a method to perform a main scanning a plurality of times for recording by transferring an ink jet head in a direction perpendicular to a transport direction of the cloth, and the ink jet method includes: a simultaneous adhesion step of adhering the treatment liquid and the chromatic ink composition to the same scanning region of the cloth by the same main scanning, and after the simultaneous adhesion step, a post-adhesion step of adhering the achromatic ink composition to the same scanning region of the cloth by a main scanning different from that in the simultaneous adhesion step.

According to the above aspect of the printing recording method, the chromatic ink adhesion step, the treatment liquid adhesion step, and the achromatic ink adhesion step may be performed on the same support.

According to any one of the aspects of the printing recording method, the support may be a belt provided with an adhesive layer.

According to any one of the above aspects of the printing recording method, the chromatic ink adhesion step and the achromatic ink adhesion step may be performed with a time lag of 10 seconds or less.

According to any one of the above aspects of the printing recording method, the chromatic ink adhesion step and the achromatic ink adhesion step may be performed with a time lag of 1 second or more.

According to any one of the above aspects of the printing recording method, the same main scanning may be performed a plurality of times on the same scanning region.

According to any one of the above aspects of the printing recording method, the cationic compound may include at least one selected from the group consisting of a polyvalent metal salt and a cationic polymer.

According to any one of the above aspects of the printing recording method, the cationic polymer may include at least one selected from the group consisting of a polyamide-epichlorohydrin resin, a polyamine-epichlorohydrin resin, a melamine resin, a blocked isocyanate resin, an oxazoline, and a carbodiimide.

According to any one of the above aspects of the printing recording method, a content of the cationic polymer with respect to a total mass of the treatment liquid may be 1 to 10 percent by mass.

According to any one of the above aspects of the printing recording method, the first resin particle may be an urethane resin.

According to any one of the above aspects of the printing recording method, the second resin particle may be an urethane resin.

According to any one of the above aspects of the printing recording method, the cloth may have a hydroxy group.

According to any one of the above aspects of the printing recording method, the treatment liquid is ejected from a first head nozzle group, the chromatic ink composition is ejected from a second head nozzle group, and the achromatic ink composition is ejected from a third head nozzle group, the first head nozzle group may be disposed at the same position as that of the second head nozzle group in the transport direction of the cloth or has a portion overlapped with the second head nozzle group in the transport direction, and the third head nozzle group may be disposed downstream than the second head nozzle group in the transport direction of the cloth.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A printing recording method comprising:
    a chromatic ink adhesion step of adhering a liquid droplet of a chromatic ink composition which contains a pigment and an anionic first resin particle to a cloth;
    a treatment liquid adhesion step of adhering a liquid droplet of a treatment liquid which contains a cationic compound to the cloth; and
    an achromatic ink adhesion step of adhering a liquid droplet of an achromatic ink composition to the cloth, the achromatic ink composition containing an anionic second resin, and the achromatic ink composition not containing a colorant,
    wherein the treatment liquid adhesion step, the chromatic ink adhesion step, and the achromatic ink adhesion step are performed by an ink jet method,
    the ink jet method is a method to perform a main scanning a plurality of times for recording by transferring an ink jet head in a direction perpendicular to a transport direction of the cloth, and
    the ink jet method includes:
        a simultaneous adhesion step of adhering the treatment liquid and the chromatic ink composition to the same scanning region of the cloth by the same main scanning, and
        after the simultaneous adhesion step, a post-adhesion step of adhering the achromatic ink composition to the same scanning region of the cloth by a main scanning different from that in the simultaneous adhesion step.

2. The printing recording method according to claim 1, wherein the chromatic ink adhesion step, the treatment liquid adhesion step, and the achromatic ink adhesion step are performed on the same support.

3. The printing recording method according to claim 2, wherein the support is a belt provided with an adhesive layer.

4. The printing recording method according to claim 1, wherein the chromatic ink adhesion step and the achromatic ink adhesion step are performed with a time lag of 10 seconds or less.

5. The printing recording method according to claim 1, wherein the chromatic ink adhesion step and the achromatic ink adhesion step are performed with a time lag of 1 second or more.

6. The printing recording method according to claim 1, wherein the same main scanning is performed a plurality of times on the same scanning region.

7. The printing recording method according to claim 1, wherein the cationic compound includes at least one selected from the group consisting of a polyvalent metal salt and a cationic polymer.

8. The printing recording method according to claim 7, wherein the cationic polymer includes at least one selected from the group consisting of a polyamide-epichlorohydrin resin, a polyamine-epichlorohydrin resin, a melamine resin, a blocked isocyanate resin, an oxazoline, and a carbodiimide.

9. The printing recording method according to claim 7, wherein a content of the cationic polymer with respect to a total mass of the treatment liquid is 1 to 10 percent by mass.

10. The printing recording method according to claim 1, wherein the first resin particle is an urethane resin.

11. The printing recording method according to claim 1, wherein the second resin particle is an urethane resin.

12. The printing recording method according to claim 1, wherein the cloth has a hydroxy group.

13. The printing recording method according to claim 1, wherein the treatment liquid is ejected from a first head nozzle group, the chromatic ink composition is ejected from a second head nozzle group, and the achromatic ink composition is ejected from a third head nozzle group, the first head nozzle group is disposed at the same position as that of the second head nozzle group in the transport direction of the cloth or has a portion overlapped with the second head nozzle group in the transport direction, and the third head nozzle group is disposed downstream than the second head nozzle group in the transport direction of the cloth.

* * * * *